US011254774B2

(12) United States Patent
Haraguchi et al.

(10) Patent No.: US 11,254,774 B2
(45) Date of Patent: Feb. 22, 2022

(54) STYRENE RESIN AND METHOD FOR PRODUCING STYRENE RESIN

(71) Applicant: JSP Corporation, Tokyo (JP)

(72) Inventors: Kenji Haraguchi, Yokkaichi (JP); Jumpei Goto, Yokkaichi (JP)

(73) Assignee: JSP Corporation, Tokyo (JP)

( * ) Notice: Subject to any disclaimer, the term of this patent is extended or adjusted under 35 U.S.C. 154(b) by 16 days.

(21) Appl. No.: 16/631,415

(22) PCT Filed: Jul. 20, 2018

(86) PCT No.: PCT/JP2018/027314

§ 371 (c)(1),
(2) Date: Jan. 15, 2020

(87) PCT Pub. No.: WO2019/017482

PCT Pub. Date: Jan. 24, 2019

(65) Prior Publication Data

US 2020/0207897 A1 Jul. 2, 2020

(30) Foreign Application Priority Data

Jul. 21, 2017 (JP) ............................ JP2017-142147
Jul. 21, 2017 (JP) ............................ JP2017-142151

(51) Int. Cl.
*C08F 257/02* (2006.01)

(52) U.S. Cl.
CPC .................................. *C08F 257/02* (2013.01)

(58) Field of Classification Search
CPC ........... C08F 257/02; C08F 2/22; C08L 25/06
See application file for complete search history.

(56) References Cited

U.S. PATENT DOCUMENTS

2014/0256898 A1 9/2014 Jiang et al.
2018/0134825 A1* 5/2018 Osby .................... C08F 210/02

FOREIGN PATENT DOCUMENTS

| | | | |
|---|---|---|---|
| JP | 2000-504054 | A | 4/2000 |
| JP | 2005-281405 | A | 10/2005 |
| JP | 2014-189767 | A | 10/2014 |
| JP | 2014-196444 | A | 10/2014 |
| JP | 2015-193761 | A | 11/2015 |
| JP | 2015-193764 | A | 11/2015 |

OTHER PUBLICATIONS

J. Pannell, Polystyrenes of known structure: Part 3. Polymers with long-chain branching, Polymer, vol. 13, Issue 1, 1972, pp. 1-12.*
Fujimoto et al. Viscoelastic Properties of Comb-Shaped Polystyrenes, Macromolecules, p. 57-64, vol. 3, No. 1, Jan.-Feb. 1970.*
International Search Report for PCT/JP2018/027314, dated Oct. 23, 2018, and English Translation submitted herewith (3 pages).

* cited by examiner

*Primary Examiner* — Jeffrey C Mullis
(74) *Attorney, Agent, or Firm* — Fitch, Even, Tabin & Flannery LLP

(57) ABSTRACT

The present invention relates to a styrene-based resin having a weight average molecular weight Mw' as determined by the GPC-MALS method of 1,000,000 or more and 5,000,000 or less, a degree of long-chain branching of 0.2 or more per 1,000 styrene units, and a tetrahydrofuran-insoluble matter of 0.1% by weight or less (including 0), the styrene-based resin being free from a component derived from a polyfunctional monomer in a molecular chain thereof. In a method for producing this styrene-based resin, in an impregnation step of adding a polymerization initiator and a styrene monomer in an aqueous medium, thereby impregnating the polymerization initiator and the styrene monomer in the seed particle at a temperature at which polymerization of the styrene monomer does not substantially proceed, the amount of the styrene monomer is 20 to 200 parts by weight based on 100 parts by weight of the seed particle; and in an additional impregnation polymerization step of graft polymerizing the styrene monomer on the styrene-based resin, the addition amount of the styrene monomer is 50 to 700 parts by weight based on 100 parts by weight of the seed particle, and the content of the styrene monomer in the seed particle is held at 10% by weight or less.

13 Claims, 9 Drawing Sheets

STYRENE RESIN AND METHOD FOR PRODUCING STYRENE RESIN

CROSS-REFERENCE TO RELATED APPLICATIONS

This application is a U.S. national phase application filed under 35 U.S.C. § 371 of International Application Number PCT/JP2018/027314, filed Jul. 20, 2018, designating the United States, which claims priority from Japanese Application Number 2017-142151, filed Jul. 21, 2017, and Japanese Application Number 2017-142147, filed Jul. 21, 2017.

FIELD OF THE INVENTION

The present invention relates to a styrene-based resin and a method for producing a styrene-based resin.

BACKGROUND OF THE INVENTION

A styrene-based resin is used as raw materials of various molded articles because it is excellent in dimensional stability, molding stability, and so on, is high in rigidity, and is inexpensive. In general, by increasing the molecular weight of a styrene-based resin, the melt tension of the resin can be increased. However, as the molecular weight of the resin is high, the fluidity of the resin in a molten state is lowered. Thus, the molding processability of the resin and productivity of molded products thereof were liable to be lowered.

In order to solve such a problem, various attempts are being made.

For example, there is disclosed a styrene-based resin composition containing a linear polystyrene and a multi-branched polystyrene, in which (1) its weight average molecular weight determined by the GPC-MALS method is 250,000 to 750,000, and (2) the gradient in a logarithm graph obtained by setting the weight average molecular weight as an abscissa and the radius of gyration of the resin composition determined by the GPC-MALS method as an ordinate is 0.35 to 0.45 (see, for example, PTL 1).

As a method for increasing the melt tension of the styrene-based resin other than the method of increasing the molecular weight of the styrene-based resin, it is known to make the molecular chain of the styrene-based resin in a branched state. However, there is a concern that a polyfunctional monomer that is indispensable for making the molecular chain in a branched state brings about gelation at the time of synthesis of the resin. In order to solve such a problem, for example, the following methods are disclosed. That is, there is disclosed a method in which a solvent-soluble polyfunctional vinyl compound copolymer having two or more vinyl groups in average in one molecule and having a branched structure is added in an amount 50 ppm to 5,000 ppm on a weight basis to a vinyl-based monomer essentially including styrene, and the contents are subjected to suspension polymerization in water, thereby producing a styrene-based resin composition containing a highly branched ultra-high-molecular weight copolymer resulting through polymerization of the solvent-soluble polyfunctional vinyl compound copolymer and the vinyl-based monomer and a linear polymer resulting through polymerization of the vinyl-based monomer (see, for example, PTL 2).

In addition, a polystyrene-based resin composition for foaming, which can allow a foamed molded article thereof to be made lightweight and productivity to be improved, is disclosed. That is, there is disclosed a polystyrene resin composition for foaming which contains, as a base material resin, a polyfunctional vinyl aromatic compound and a component derived from a styrene-based monomer, wherein the polyfunctional vinyl-based aromatic compound has a molecular weight of 100 or more and less than 1,000; the base material resin is one obtained by polymerizing a monomer mixture containing 50 to 500 ppm of the polyfunctional vinyl-based aromatic compound in the styrene-based monomer; and the base material resin has (1) a melt flow rate (MFR: g/10 minutes) and a melt tension value (MT: cN) satisfying the following relational expression under a measuring condition at 200° C.: [$MT \geq -3 \times \ln(MFR)+12$], and (2) a ratio of a loss tangent tan δ at an angular frequency ω at 0.01 rad/s and 100 rad/s satisfying the following relational expression: [$4 \leq \tan\delta\ (\omega=0.01\ (rad/s))/\tan\delta\ (\omega=100\ (rad/s)) \leq 20$] (see, for example, PTL 3).

Furthermore, a polystyrene-based resin composition for extrusion foaming which allows improvement of productivity at the time of molding while reducing elution of styrene and an oligomer thereof into a foamed molded article, is disclosed. That is, there is disclosed a polystyrene-based resin composition for extrusion expansion which has following physical properties: (1) a top peak molecular weight (Mp) in the molecular weight distribution is 140,000 to 220,000; (2) a ratio of molecular weights equal to or lower than Mp is 40 to 55% of the whole; (3) a (z+1) average molecular weight is 800,000 to 3,500,000; (4) the content of an oligomer composed of a styrene dimer and a styrene trimer is 2,000 ppm or less; and (5) the content of styrene is 1,000 ppm or lower (see, for example, PTL 4).

CITATION LIST

Patent Literature

PTL 1: JP 2005-281405 A
PTL 2: JP 2014-189767 A
PTL 3: JP 2015-193761 A
PTL 4: JP 2015-193764 A

SUMMARY OF INVENTION

However, in the styrene-based resins disclosed in all of PTLs 1 to 4, a degree of long-chain branching is low, and the weight average molecular weight determined by the GPC-MALS method is several hundred thousand and is less than 1,000,000. For that reason, not only the melt tension of the styrene-based resin was unsatisfactory, but also there was room for improvement in molecular orientation properties of the resin at the time of molding processing. In addition, when intending to produce a branched styrene-based resin having a high degree of long-chain branching by using the polyfunctional monomer as in PTLs 3 and 4, the fluidity was lowered, so that the molding processability was not excellent. In addition, when increasing the degree of polymerization in order to further increase the degree of long-chain branching, the gelation occurred, resulting in a problem that the resulting styrene-based resin contains a lot of gels.

An object of the present invention is to provide a branched styrene-based resin excellent in molding processability.

In addition, an another object of the present invention is to provide a method for producing a branched styrene-based resin, which enables one to produce a styrene-based resin having a branched structure that is high in fluidity and high in melt tension.

Specifically, the present invention is as follows.

<1> A styrene-based resin having a weight average molecular weight Mw' as determined by the GPC-MALS method of 1,000,000 or more and 5,000,000 or less, a degree of long-chain branching of 0.2 or more per 1,000 styrene units, and a tetrahydrofuran-insoluble matter of 0.1% by weight or less (including 0), the styrene-based resin being free from a component derived from a polyfunctional monomer in a molecular chain thereof.

<2> The styrene-based resin as set forth in <1>, wherein the degree of long-chain branching is 0.3 or more per 1,000 styrene units.

<3> The styrene-based resin as set forth in <1> or <2>, wherein a Z average molecular weight Mz' as determined by the GPC-MALS method is 3,000,000 or more.

<4> The styrene-based resin as set forth in any one of <1> to <3>, wherein a ratio Mz'/Mn' of the Z average molecular weight Mz' to a number average molecular weight Mn' as determined by the GPC-MALS method is 7 or more.

<5> The styrene-based resin as set forth in any one of <1> to <4>, wherein the total content of a styrene dimer and a styrene trimer is 0.1% by weight or less.

<6> The styrene-based resin as set forth in any one of <1> to <5>, wherein a melt viscosity at 200° C. and a shear rate of 100 $sec^{-1}$ is 2,100 Pa·s or less, a melt tension at 200° C. is 350 mN or more, and a ratio of the melt tension to the melt viscosity {(melt tension)/(melt viscosity) [mN/(Pa·s)]} is 0.20 or more.

<7> A method for producing a styrene-based resin including a dispersing step of dispersing a seed particle containing a styrene-based resin in an aqueous medium;

an impregnation step of adding a polymerization initiator containing an organic peroxide and a styrene monomer in the aqueous medium, thereby impregnating the polymerization initiator and the styrene monomer in the core particle at a temperature at which polymerization of the styrene monomer does not substantially proceed;

a polymerization commencing step of subjecting the aqueous medium to temperature rise, thereby commencing polymerization of the styrene monomer; and an additional impregnation polymerization step of additionally adding the styrene monomer in the aqueous medium, thereby graft polymerizing the styrene monomer on the styrene-based resin while impregnating the styrene monomer in the seed particle, wherein the addition amount of the styrene monomer in the impregnation step is from 10 to 200 parts by weight based on 100 parts by weight of the seed particle, the addition amount of the styrene monomer in the additional impregnation polymerization step is from 50 to 700 parts by weight based on 100 parts by weight of the seed particle, and the content of the styrene monomer in the seed particle in the additional impregnation polymerization step is held at 10% by weight or less.

<8> The method for producing a styrene-based resin as set forth in <7>, wherein the addition amount of the styrene monomer in the impregnation step is from 20 to 200 parts by weight based on 100 parts by weight of the seed particle.

<9> The method for producing a styrene-based resin as set forth in <7> or <8>, wherein the aqueous medium has an oxygen concentration at 30° C. of 4 mg/L or more.

<10> The method for producing a styrene-based resin as set forth in any one of <7> to <9>, wherein an average particle diameter of the seed particle in the dispersing step is from 0.3 to 1.2 mm.

<11> The method for producing a styrene-based resin as set forth in any one of <7> to <10>, wherein a 10-hour half-life temperature $T_{1/2}$ of the organic peroxide is from 85 to 120° C., a temperature of the aqueous medium in the impregnation step is 70° C. or higher and $(T_{1/2}-15)$° C. or lower, and a temperature of the aqueous medium in the additional impregnation polymerization step is $(T_{1/2}-10)$° C. or higher and $(T_{1/2}+20)$° C. or lower.

<12> The method for producing a styrene-based resin as set forth in any one of <7> to <11>, wherein in the additional impregnation polymerization step, the styrene monomer is polymerized in the presence of a chain transfer agent, and a ratio of the total addition amount of the chain transfer agent to the total addition amount of the polymerization initiator is from 0.1 to 0.6.

<13> The method for producing a styrene-based resin as set forth in <12>, wherein in the impregnation step, the chain transfer agent is impregnated in the seed particle.

<14> The method for producing a styrene-based resin as set forth in <12> or <13>, wherein the chain transfer agent is an α-methylstyrene dimer.

In this specification, the styrene-based resin according to the above <1> to <6> is referred to as a first embodiment of the present invention, and the method for producing a styrene-based resin according to the above <7> to <14> is referred to as a second embodiment of the present invention.

In accordance with the present invention, a styrene-based resin excellent in molding processability can be provided.

In addition, in accordance with the present invention, a method for producing a styrene-based resin, which enables one to produce a styrene-based resin having a branched structure that is high in fluidity and high in melt tension, can be provided.

DESCRIPTION OF EMBODIMENTS

First Embodiment

<Styrene-Based Resin>

Figure 1:
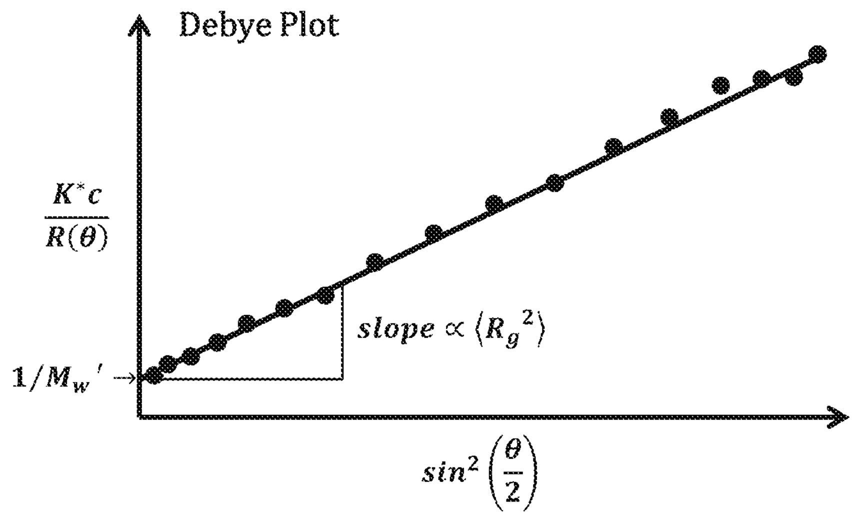
FIG. 1 is an example of Debye plots obtained when measuring styrene-based resins by the GPC-MALS method.
Figure 2:
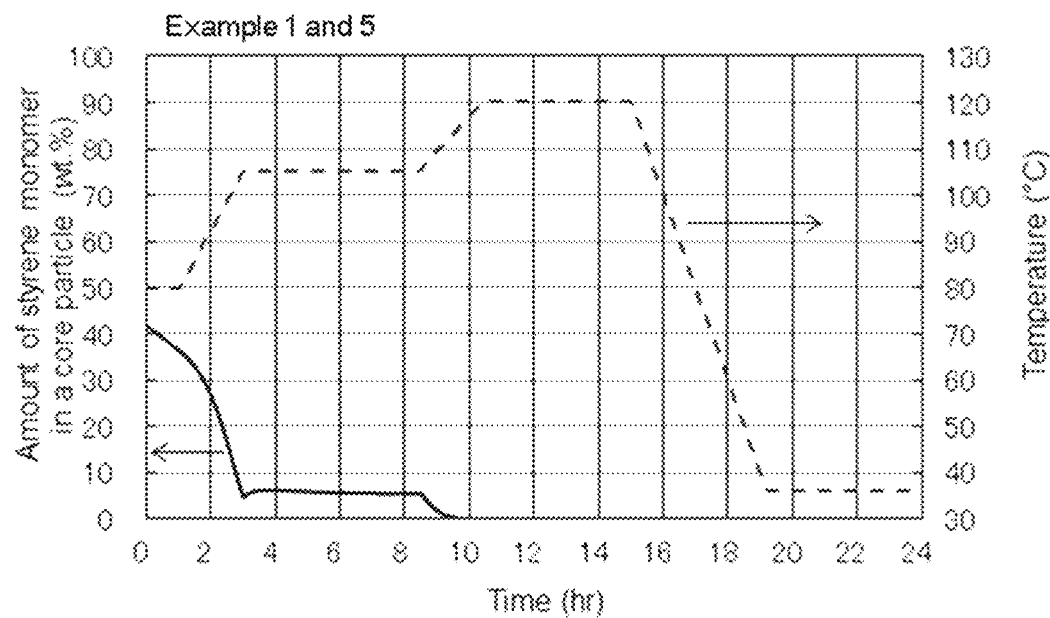
FIG. 2 is a graph of simulation results in Examples 1 and 5.
Figure 3:
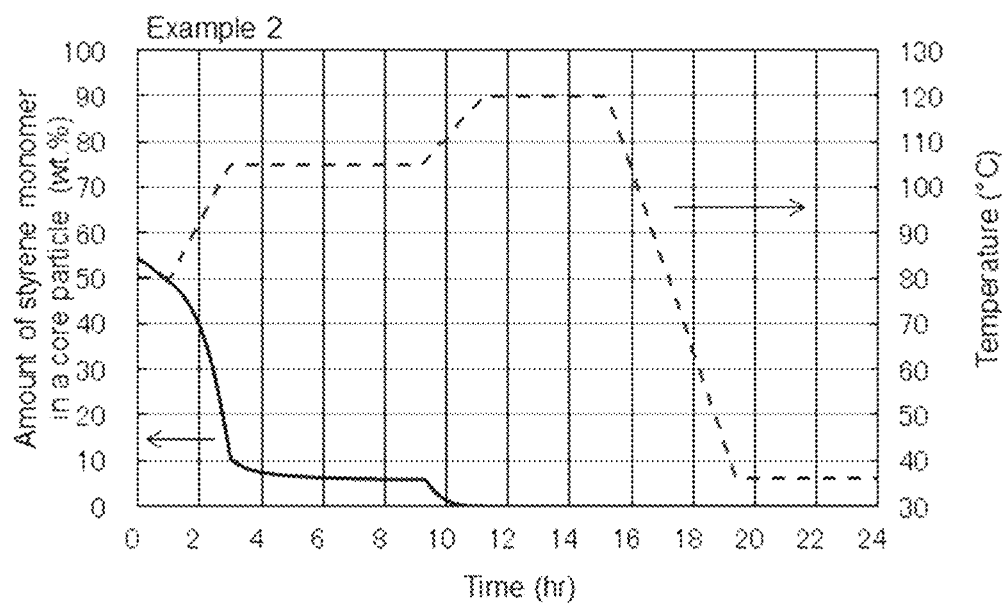
FIG. 3 is a graph of simulation results in Example 2.
Figure 4:
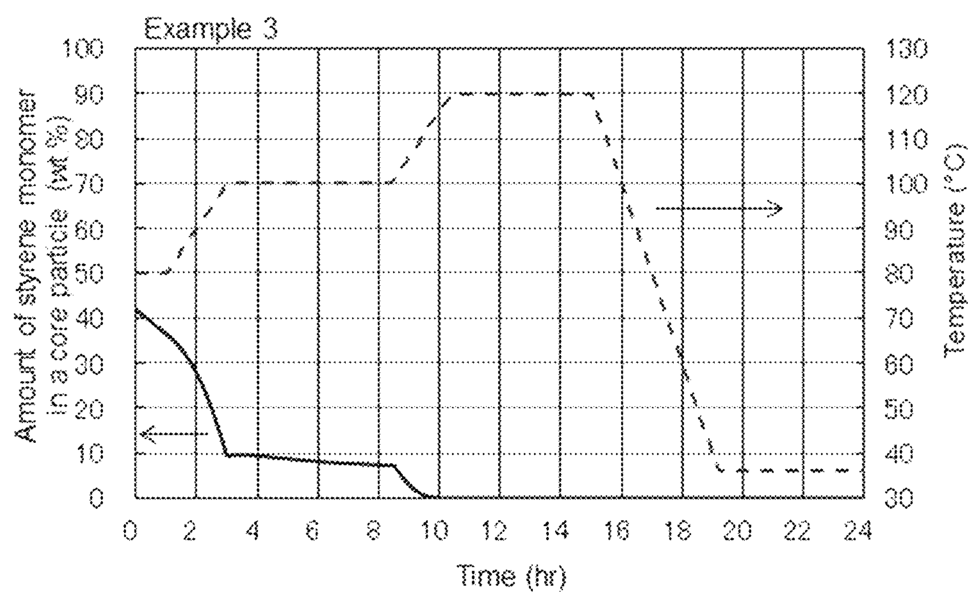
FIG. 4 is a graph of simulation results in Example 3.
Figure 5:
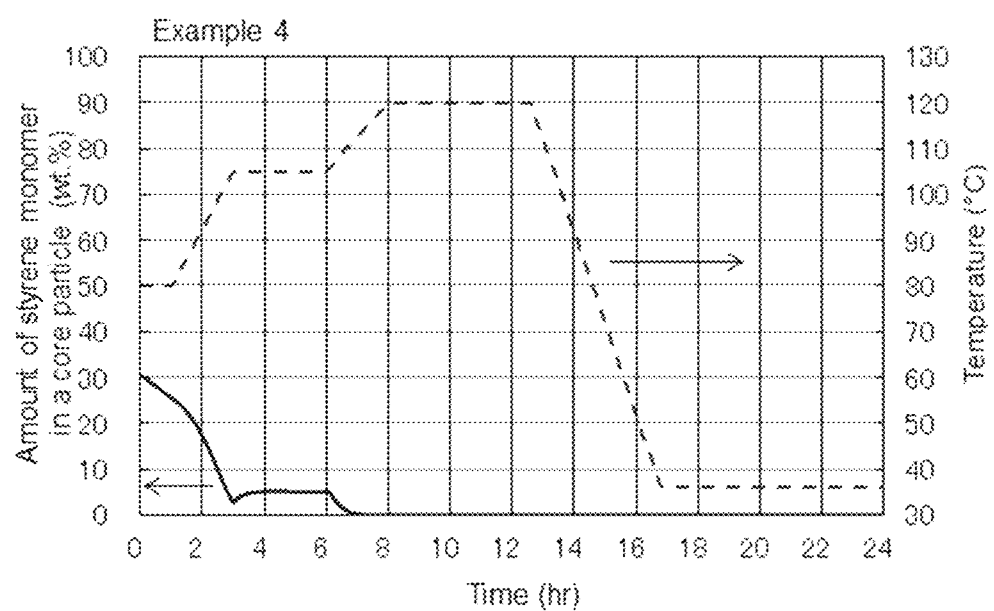
FIG. 5 is a graph of simulation results in Example 4.
Figure 6:
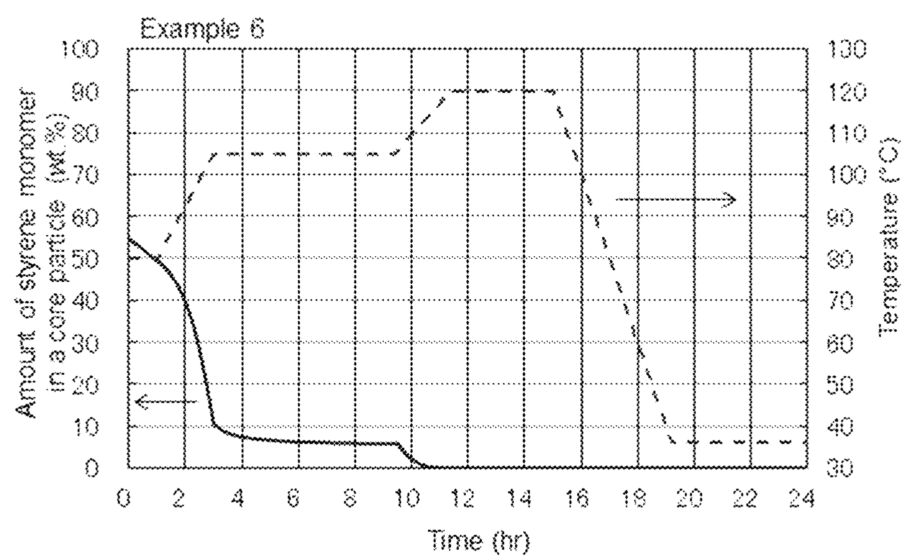
FIG. 6 is a graph of simulation results in Example 6.
Figure 7:
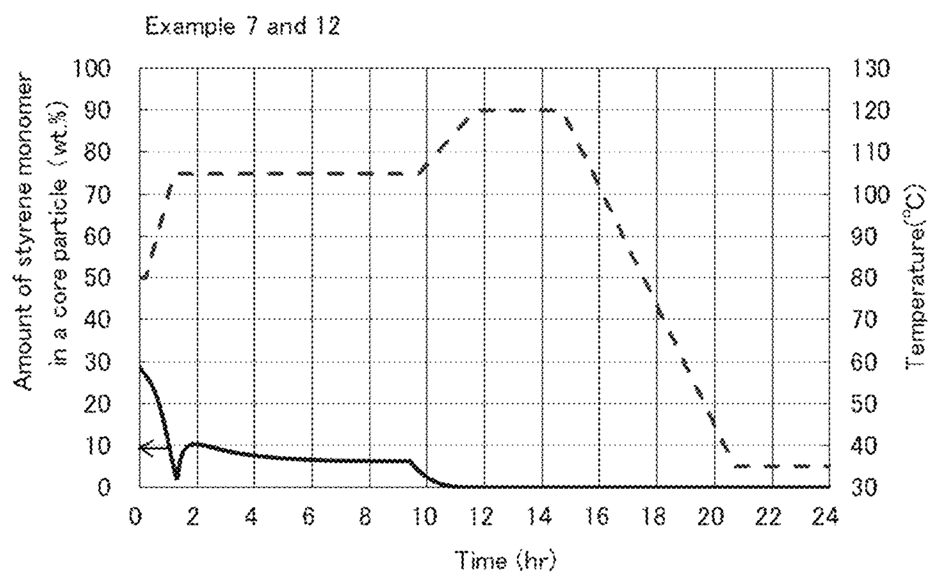
FIG. 7 is a graph of simulation results in Examples 7 and 12.
Figure 8:
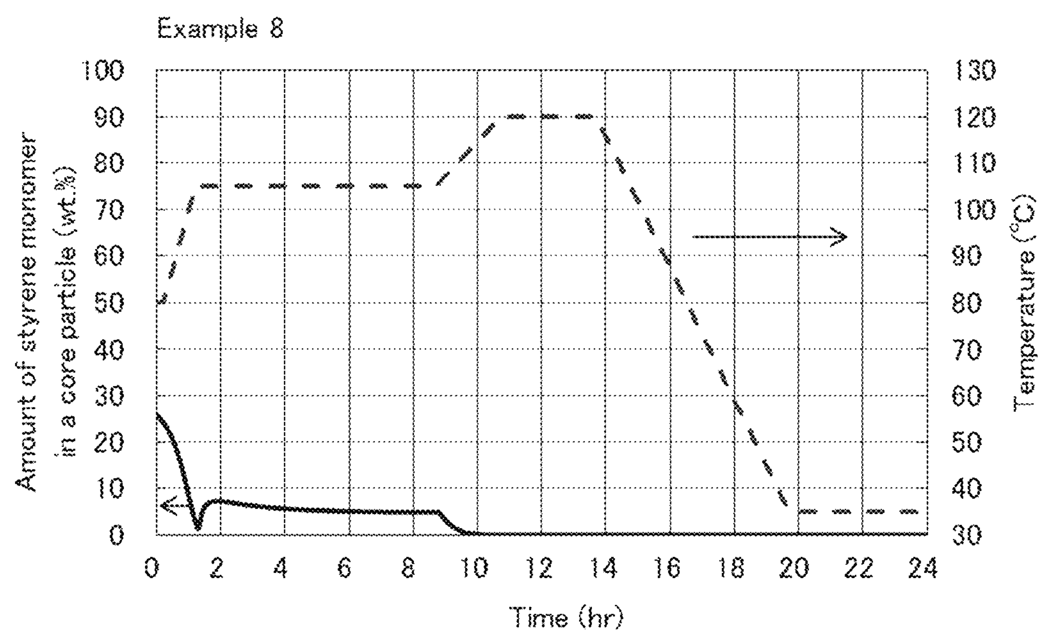
FIG. 8 is a graph of simulation results in Example 8.
Figure 9:
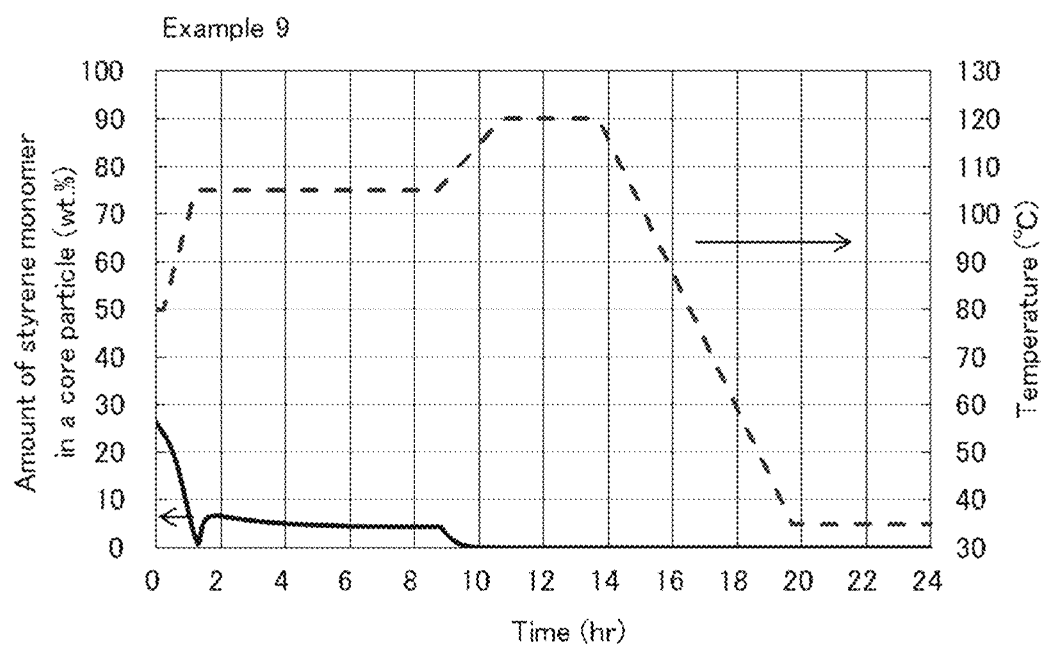
FIG. 9 is a graph of simulation results in Example 9.
Figure 10:
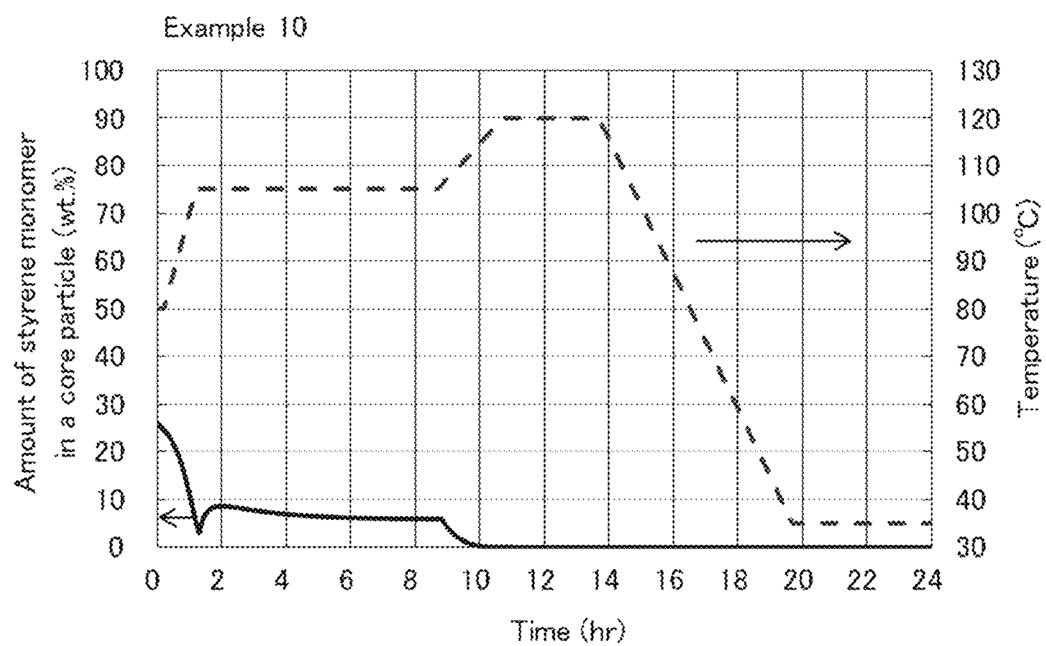
FIG. 10 is a graph of simulation results in Example 10.
Figure 11:
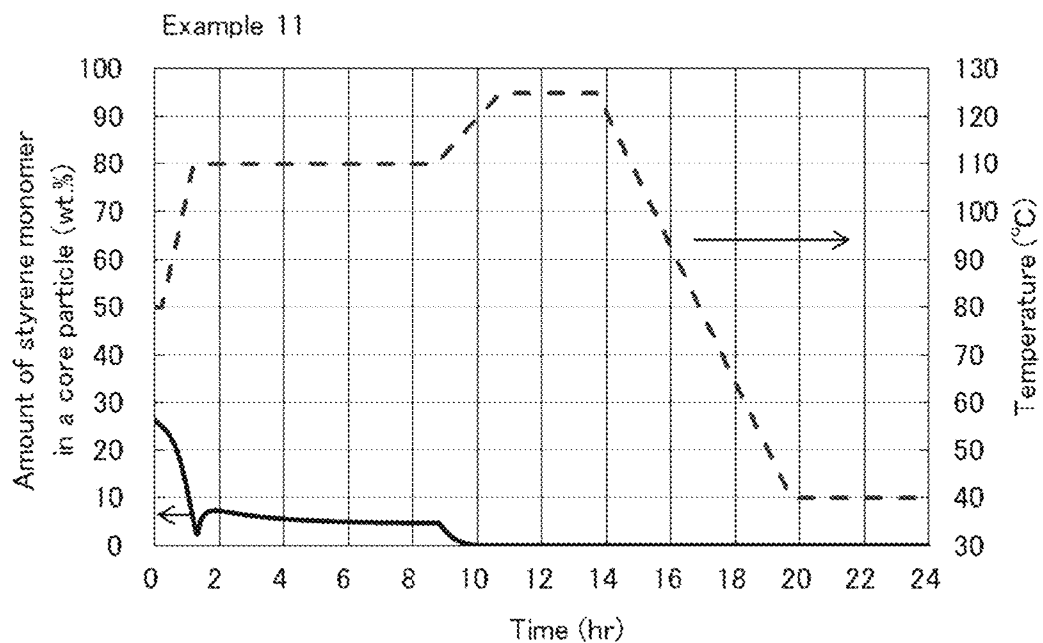
FIG. 11 is a graph of simulation results in Example 11.
Figure 12:
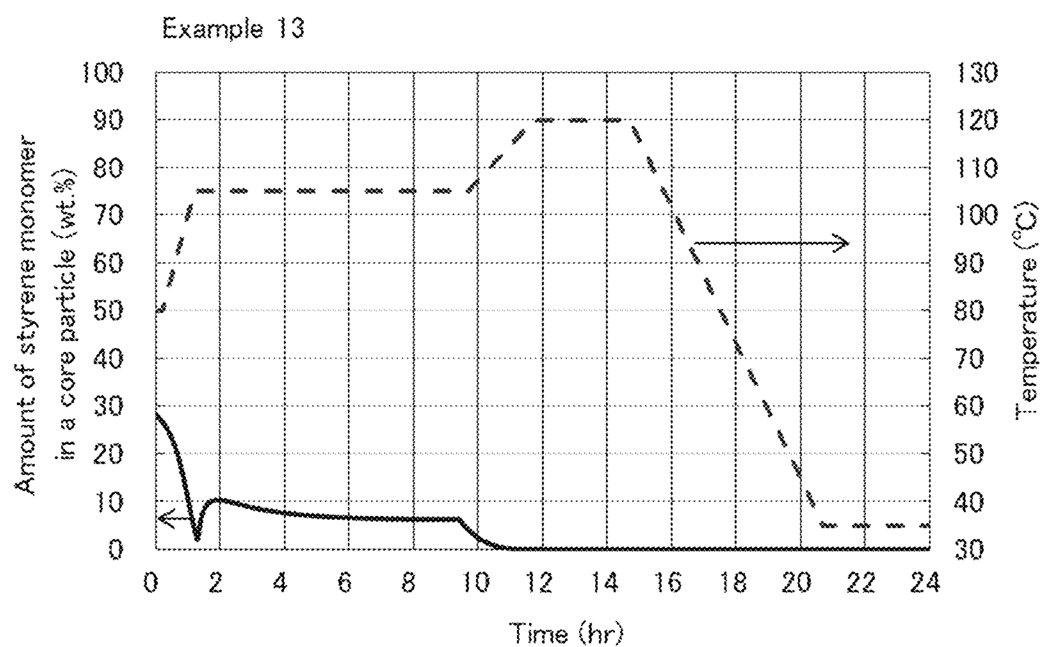
FIG. 12 is a graph of simulation results in Example 13.
Figure 13:
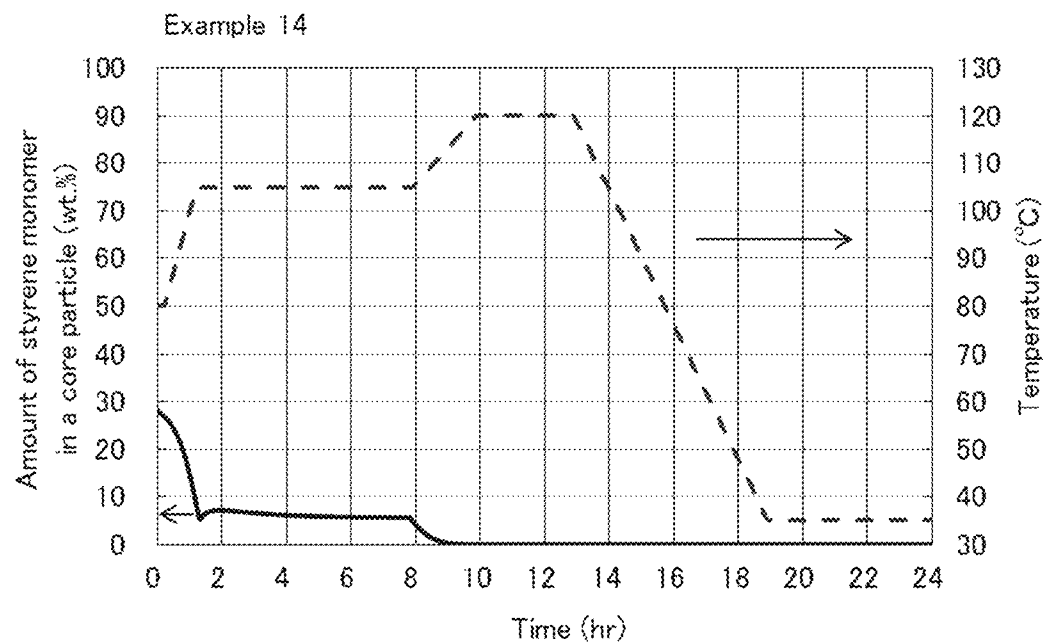
FIG. 13 is a graph of simulation results in Example 14.
Figure 14:
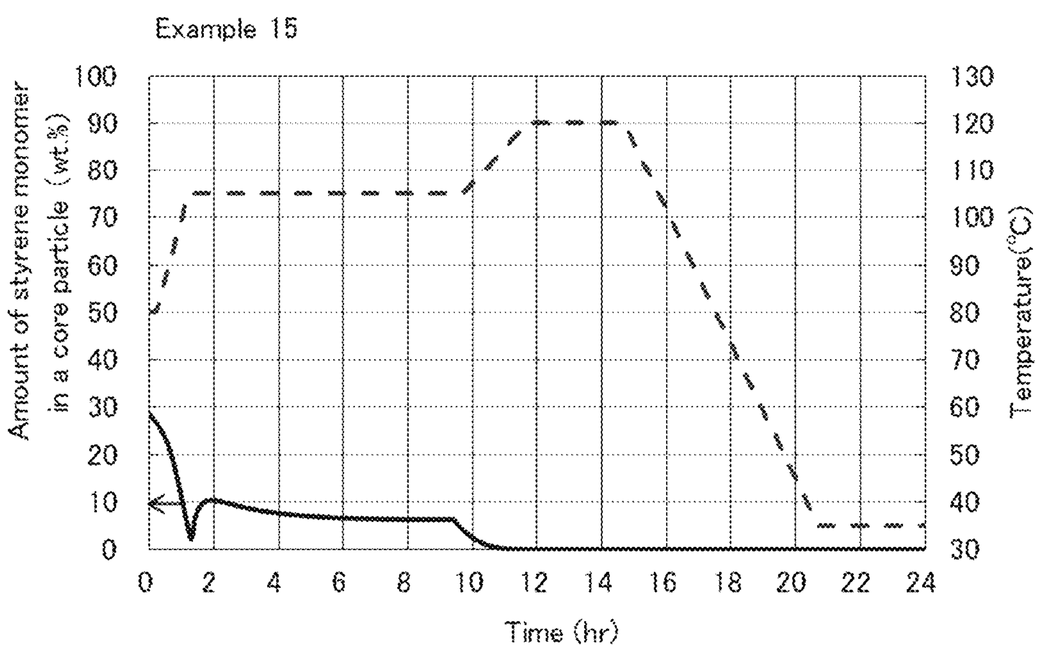
FIG. 14 is a graph of simulation results in Example 15.
Figure 15:
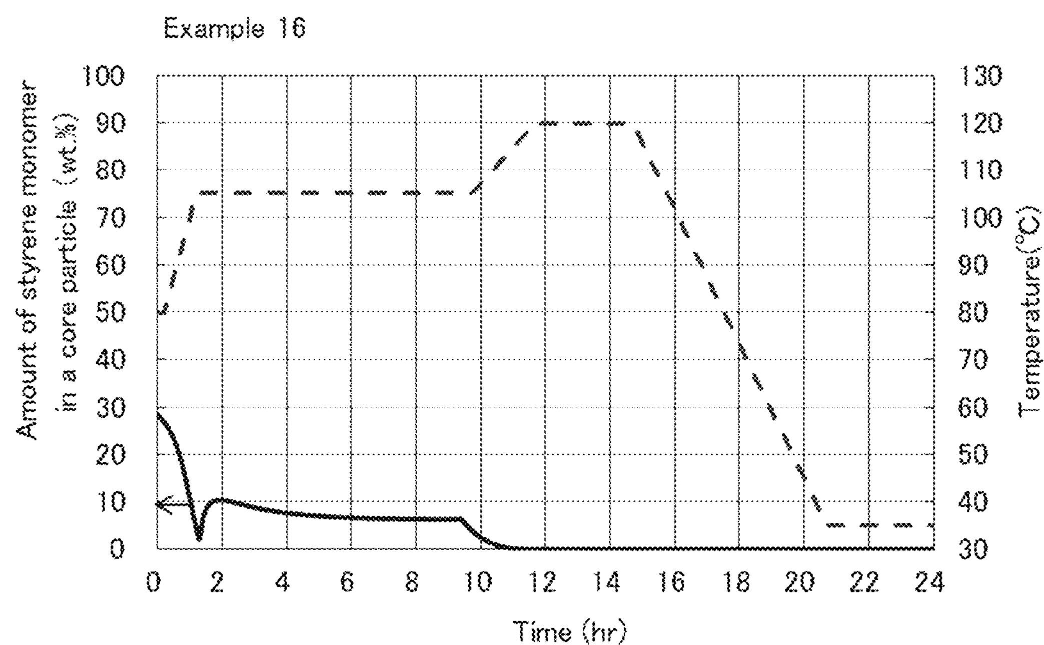
FIG. 15 is a graph of simulation results in Example 16.
Figure 16:
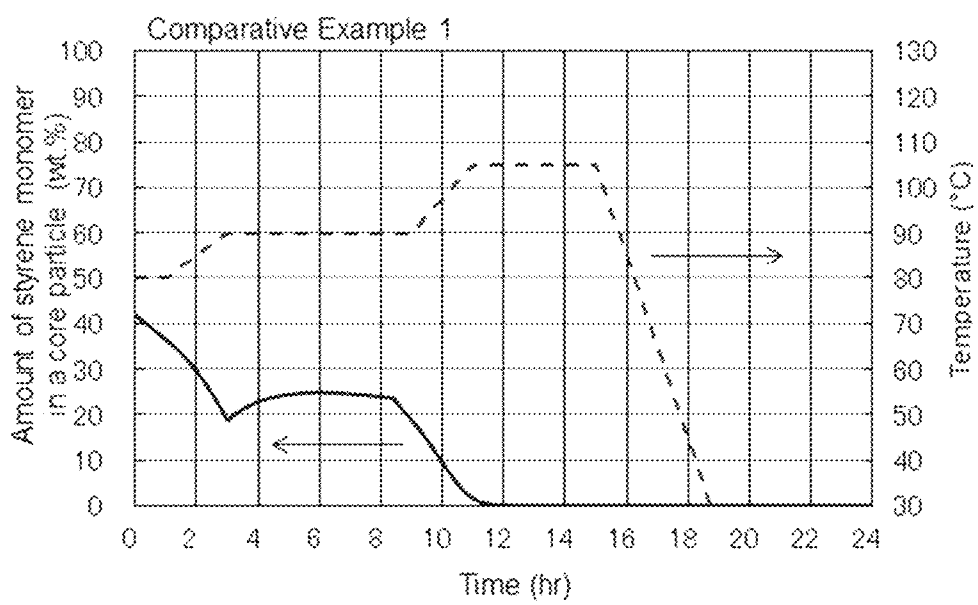
FIG. 16 is a graph of simulation results in Comparative Example 1.
Figure 17:
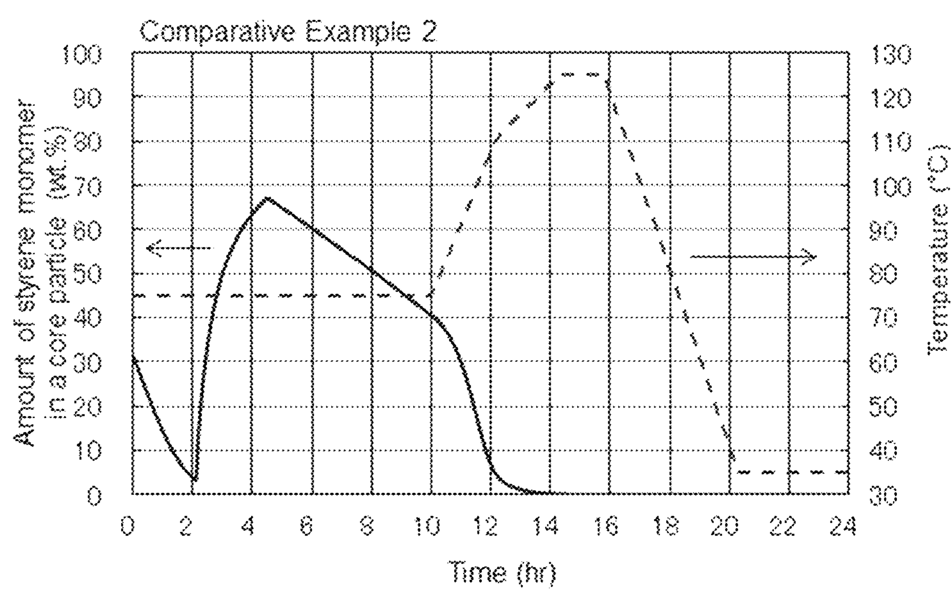
FIG. 17 is a graph of simulation results in Comparative Example 2.

The styrene-based resin according to the first embodiment of the present invention (hereinafter also referred to as "styrene-based resin of the present invention") is a styrene-based resin having a weight average molecular weight Mw' as determined by the GPC-MALS method of 1,000,000 or more and 5,000,000 or less and a degree of long-chain branching of 0.2 or more per 1,000 styrene units. Furthermore, a proportion of a tetrahydrofuran-insoluble matter in the styrene-based resin of the present invention is 0.1% by weight or less (including 0). The styrene-based resin of the present invention does not contain a component derived from a polyfunctional monomer in a molecular chain thereof. That is, the content of the component derived from a polyfunctional monomer in a molecular chain of the styrene-based resin is 0% by weight.

Here, the GPC-MALS method is a technique combining the gel permeation chromatography (hereinafter occasionally referred to as "GPC") with a multi angle light scattering (MALS) detector. According to the GPC-MALS method, an absolute molecular weight and a molecular size of the styrene-based resin are measured, and from the measurement results, the degree of long-chain branching of the styrene-based resin is determined.

In general, as a means for improving the melt tension of a styrene-based resin to improve the strength, an increase of the molecular weight of a resin is useful. However, there was involved such a problem that when simply increasing the molecular weight, the fluidity of the resin is lowered, and the molding processability is deteriorated. As a means for improving the strength while holding the fluidity of a resin, introduction of a branched structure into a molecular chain is useful. In the resin having a branched structure, a degree of entanglement of the molecular chains with each other becomes large, and therefore, the melt tension becomes high, and breakage hardly occurs at the time of stretching processing. As a method for incorporating the branched structure into the molecular chain of the styrene-based resin, there is a method for performing polymerization of a styrene monomer in the presence of, as a branching agent, a polyfunctional monomer, such as divinylbenzene.

But, in the conventional styrene-based resins having a branched structure, there was involved such a problem that branching points are converged in a portion where the polyfunctional monomer is polymerized, so that a microgel is liable to be formed. In order to increase the branched structure of the styrene-based resin, when increasing the addition amount of the polyfunctional monomer, the polyfunctional monomers come close to each other within the reaction system, so that gelation is liable to occur during the polymerization. Therefore, the addition amount of the polyfunctional monomer was limited, and it was difficult to increase the melt tension to a fixed level or higher while holding the fluidity of the resin.

On the other hand, nevertheless the styrene-based resin of the present invention has a high molecular weight, it has a structure in which the number of branching points is high (high degree of branching), and the branching points are away from each other. Thus, it may be considered that the styrene-based resin of the present invention has both high melt tension and excellent fluidity.

When the styrene-based resin of the present invention is subjected to molecular analysis by the GPC-MALS method, the weight average molecular weight Mw' as determined by the GPC-MALS method is 1,000,000 or more and 5,000,000 or less, and the degree of long-chain branching is 0.2 or more per 1,000 styrene units.

First of all, a basic principle of the GPC-MALS method is described.

[Basic Principle of GPC-MALS Method]

When the styrene-based resin is dissolved in a solvent, such as tetrahydrofuran, to prepare a styrene-based resin solution, followed by performing the GPC measurement, a polymer having a larger molecular size is first eluted. Thus, the styrene-based resin solution can be separated depending upon the molecular size. Subsequently, when the separated styrene-based resin solution is subjected to the MALS measurement, a weight average molecular weight (Mw') of the styrene-based resin which has been separated depending upon the molecular seize and a mean-square radius of gyration $\langle R_g^2 \rangle$ corresponding to the molecular size are calculated.

Specifically, the styrene-based resin solution which has been separated depending upon the molecular size by means of the GPC measurement is irradiated with a laser light, and a scattered light intensity generated from the styrene-based resin solution owing to the Rayleigh scattering is measured. From the resulting measured values, the weight average molecular weight Mw' and the mean-square radius of gyration $\langle R_g^2 \rangle$ are calculated using the following expression (1) and the Debye plots shown in FIG. 1.

$$\frac{K^* c}{R(\theta)} = \frac{1}{Mw' \cdot P(\theta)} + 2A_2 c \quad (1)$$

$K^*$: Optical parameter $(4\pi^2 n_0^2 (dn/dc)^2 / [\lambda_0 4 N_A])$ $n_0$: Refractive index of solvent dn/dc: Increase in concentration of refractive index $\lambda_0$: Wavelength of incident light in a vacuum $N_A$: Avogadro number c: Sample concentration (g/mL)

$R(\theta)$: Rayleigh ratio of excessive scattering

Mw': Weight average molecular weight (g/mol)

$P(\theta)$: Interference factor $P(\theta) = (1 - 2\{(4\pi/\lambda)\sin(\theta/2)\}^2 \langle R_g^2 \rangle / 3! + \ldots)$ $\lambda$: Wavelength in measuring system, $\lambda_0/n_0$ $\langle R_g^2 \rangle$: Mean-square radius of gyration $A_2$: Second virial coefficient FIG. 1 is an example of Debye plots obtained by measuring styrene-based resin solutions having a different resin concentration from each other by the GPC-MALS method and plotting "$K^*c/R(\theta)$" on the ordinate (Y-axis) and "$\sin^2(\theta/2)$" on the abscissa (X-axis), respectively.

The weight average molecular weight Mw' of the styrene-based resin which has been separated depending upon the molecular size by means of the GPC measurement and the mean-square radius of gyration $\langle R_g^2 \rangle$ of the styrene-based resin are determined from the intercept (Y-axis intercept) between a recurrence straight line obtained from the Debye plots and the ordinate and from the initial gradient of the recurrence straight line, respectively.

In the GPC measurement, the sample concentration at each elution time is extremely diluted. Therefore, when the analysis is performed while defining the term of $2A_2C$ as 0, the weight average molecular weight Mw' of the styrene-based resin which has been separated depending upon the molecular size by means of the GPC measurement and the mean-square radius of gyration $\langle R_g^2 \rangle$ are determined according to the following expressions (2) and (3), respectively.

$$\frac{1}{Mw'} = \frac{K^* c}{R_0} \quad (2)$$

$$\frac{dy}{dx} = \frac{16\pi^2 \langle R_g^2 \rangle}{3\lambda^2 Mw'} \quad (3)$$

$K^*c/R_0$: $K^*c/R(\theta)$ at an angle $\theta$ of 0° dy/dx: Initial gradient of recurrence straight line

In the present invention, by performing the analysis with an analysis software ASTRA, manufactured by Wyatt Technology Corporation by using a Prominence LC-20AD (2HGE)/WS system, manufactured by Shimadzu Corporation and a multi angle light scattering (MALS) detector DAWN HELEOS II, manufactured by Wyatt Technology Corporation, the number average molecular weight (Mn'), the weight average molecular weight (Mw'), the Z average molecular weight (Mz'), and the degree of long-chain branching per 1,000 styrene units of the styrene-based resin are determined from the weight average molecular weight Mw' and the mean-square radius of gyration $<R_g^2>$ of the styrene-based resin of each molecular size.

With respect to the thus obtained molecular weights according to this analysis, the number average molecular weight Mn' is the "number average molecular weight Mn' as determined by the GPC-MALS method" in the present invention; the weight average molecular weight Mw' is the "weight average molecular weight Mw' as determined by the GPC-MALS method" in the present invention; and the Z average molecular weight Mz' is the "Z average molecular weight Mz' as determined by the GPC-MALS method" in the present invention.

Preferably, the measuring condition is as follows.

Eluent: Tetrahydrofuran (THF)

Flow rate: 1.0 mL/min

Column: One column of TSKgel HHR-H and two columns of TSKgel GMHHR, all of which are manufactured by Tosoh Corporation, are serially connected to each other.

The number average molecular weight Mn', the weight average molecular weight Mw', and the Z average molecular weight Mz', all of which are determined by the GPC-MALS method, are each an absolute molecular weight of the styrene-based resin.

Meanwhile, the number average molecular weight Mn, the weight average molecular weight Mw, and the Z average molecular weight Mz, all of which are determined by the GPC method while using a linear polystyrene as a standard substance, are each a relative molecular weight of the styrene-based resin.

In the present invention, as a contraction factor g of the styrene-based resin, a value determined in the following manner is used.

The contraction factor g can be determined on a basis of the following expressions (4) to (8) while defining a ratio of a mean-square radius of gyration $<R_g^2>_B$ of the styrene-based resin having a branched structure of the present invention to a mean-square radius of gyration $<R_g^2>_L$ of a linear polystyrene-based resin as the contraction factor g. Then, a degree of long-chain branching $B_m$ is determined from the contraction factor g. In the present invention, on the assumption that the styrene-based resin is a three-chain branched structure, the degree of long-chain branching is determined.

A contraction factor $g_w$, a degree of long-chain branching $B_{m,w}$ per molecule, and a degree of long-chain branching $B_{m,1000}$ per 1,000 styrene units are determined according to the following expressions (4) to (8).

$$g = \frac{\langle R_g^2 \rangle_B}{\langle R_g^2 \rangle_L} \tag{4}$$

$$g = \left[\left(1 + \frac{B_m}{7}\right)^{1/2} + \frac{4B_m}{9\pi}\right]^{-1/2} \tag{5}$$

-continued $$g_w = \frac{\sum g_i \cdot c_i}{\sum c_i} \tag{6}$$

$$B_{m,w} = \frac{\sum B_{m,i} \cdot c_i}{\sum c_i} \tag{7}$$

$$B_{m,1000} = \frac{104000 \cdot B_{m,w}}{Mw'} \tag{8}$$

In the foregoing expressions, $g_i$ is a contraction factor at an interval i; $B_{m,i}$ is a degree of long-chain branching at an interval i; and $c_i$ is a sample concentration at an interval i.

[Tetrahydrofuran-Insoluble Matter (THF-Insoluble Matter)]

The tetrahydrofuran (THF)-insoluble matter of the styrene-based resin of the present invention is 0.1% by weight or less (including 0). As mentioned above, nevertheless the styrene-based resin of the present invention has a high molecular weight and has a number of long-chain branches, it does not contain a component derived from the polyfunctional monomer in a molecular chain thereof, and therefore, the aforementioned range of the THF-insoluble matter can be achieved. The proportion of the THF-insoluble matter in the styrene-based resin is preferably 0.05% by weight or less, and more preferably 0.01% by weight or less.

1 g of the styrene-based resin in the styrene-based resin is precisely weighed, to which is then added 30 mL of tetrahydrofuran, and the styrene-based resin is immersed at 23° C. for 24 hours and then shaken for 5 hours, followed by standing. Subsequently, the supernatant is removed by means of decantation, and 10 mL of tetrahydrofuran is again added, followed by standing. The supernatant is removed by means of decantation, and the residue is dried at 23° C. for 24 hours. The weight of the residue after drying is determined, and the tetrahydrofuran-insoluble matter is determined according to the following expression.

Tetrahydrofuran-insoluble matter (%)=[(Insoluble matter weight after drying)/(Weight of sample)]×100

[Weight Average Molecule Weight Mw']

The weight average molecular weight Mw' of the styrene-based resin of the present invention is 1,000,000 or more and 5,000,000 or less.

In the case where the weight average molecular weight Mw' is 1,000,000 or more, the resin is hardly broken at the time of molding, such as extrusion molding, foam molding, and blow molding. The weight average molecular weight Mw' is preferably 1,200,000 or more, more preferably 1,550,000 or more, and still more preferably 1,800,000 or more.

From the viewpoint of fluidity at the time of melting, the weight average molecular weight Mw' is preferably 3,000,000 or less, and more preferably 2,500,000 or less.

[Number Average Molecular Weight Mn']

From the viewpoint of melt tension, the number average molecular weight Mn' of the styrene-based resin of the present invention is preferably 300,000 or more, more preferably 500,000 or more, still more preferably 700,000 or more, especially preferably 850,000 or more, and yet still more preferably 1,000,000 or more.

From the viewpoint of fluidity at the time of melting, the number average molecular weight Mn' is preferably 3,000,000 or less, more preferably 1,000,000 or less, and still more preferably 900,000 or less.

[Z Average Molecular Weight Mz']

The Z average molecular weight Mz' of the styrene-based resin of the present invention is preferably 3,000,000 or more, more preferably 3,500,000 or more, still more preferably 5,000,000 or more, and especially preferably 8,000,000 or more.

From the viewpoint of fluidity at the time of melting, the Z average molecular weight Mz' is preferably 15,000,000 or less, and more preferably 12,000,000 or less.

(Ratio Mz'/Mn' of Z Average Molecular Weight Mz' to Number Average Molecular Weight Mn)

The ratio (Mz'/Mn') of the Z average molecular weight Mz' to the number average molecular weight Mn' of the styrene-based resin of the present invention is preferably 4 or more. In particular, from the viewpoint of making both high fluidity and high melt tension at the time of melting compatible with each other at a high level, the Mz'/Mn' is more preferably 7 or more, still more preferably 8 or more, and especially preferably 10 or more. An upper limit of the Mz'/Mn' is preferably 25, and more preferably 20.

(Ratio Mw'/Mn' of Weight Average Molecular Weight Mw' to Number Average Molecular Weight Mn)

The ratio (Mw'/Mn') of the weight average molecular weight Mw' to the number average molecular weight Mn' of the styrene-based resin of the present invention is preferably 1.5 to 2.0.

(Ratio Mz'/Mw' of Z Average Molecular Weight Mz' to Weight Average Molecular Weight Mw')

The ratio (Mz'/Mw') of the Z average molecular weight Mz' to the weight average molecular weight Mw' of the styrene-based resin of the present invention is preferably 2.0 to 3.5.

[Contraction Factor $g_w$]

The contraction factor $g_w$ of the styrene-based resin of the present invention is preferably 0.80 or less, more preferably 0.75 or less, still more preferably 0.70 or less, and especially preferably 0.67 or less. A lower limit thereof is preferably approximately about 0.4.

(Degree of Long-Chain Branching $B_{m,w}$ Per Molecule)

The degree of long chain branching $B_{m,w}$ per molecule of the styrene-based resin of the present invention is preferably 4 to 20, and more preferably 5 to 18.

(Degree of Long-Chain Branching $B_{m,1000}$ Per 1,000 Styrene Units)

The degree of long chain branching $B_{m,1000}$ per 1,000 styrene units of the styrene-based resin of the present invention is 0.2 or more, preferably 0.3 or more, more preferably 0.32 or more, still more preferably 0.35 or more, and especially preferably 0.4 or more. An upper limit thereof is approximately 2.

(Ratio Mw/Mw' of Weight Average Molecular Weight Mw to Weight Average Molecular Weight Mw')

In the styrene-based resin of the present invention, the ratio (Mw/Mw') of the weight average molecular weight Mw as determined by the GPC method while using a linear polystyrene as a standard substance to the weight average molecular weight Mw' is preferably 0.5 or less.

The styrene-based resin of the present invention may be a homopolymer of a styrene monomer or may be a styrene copolymer of a styrene monomer and other monomer so long as the weight average molecular weight Mw' is 1,000,000 or more and 5,000,000 or less, and the degree of long-chain branching $B_{m,1000}$ is 0.2 or more.

In the case where the styrene-based resin is a copolymer, a proportion of the structural unit derived from the styrene monomer to be contained in the copolymer is at least 50% by weight or more, preferably 60% by weight or more, and more preferably 80% by weight or more.

Specifically, examples of the styrene-based resin include a polystyrene, a rubber-modified polystyrene (high-impact polystyrene), a styrene-acrylonitrile copolymer, a styrene-acrylic acid copolymer, a styrene-methacrylic acid copolymer, a styrene-methyl methacrylate copolymer, and a styrene-maleic anhydride copolymer.

The total content of a styrene dimer and a styrene trimer of the styrene-based resin of the present invention is preferably 0.1% by weight or less.

The styrene dimer and the styrene trimer (hereinafter occasionally referred to as "styrene oligomers") are formed in a production process of the styrene-based resin, and these occasionally remain in the styrene-based resin as they are without being incorporated into the molecular chain of the styrene-based resin. When the styrene-based resin contains the styrene oligomers, the styrene oligomers are occasionally extracted from the foamed molded article. Therefore, the total content of the styrene dimer and the styrene trimer is preferably 0.1% by weight or less.

A melt viscosity at 200° C. and a shear rate of 100 $sec^{-1}$ of the styrene-based resin of the present invention is preferably 2,100 Pa·s or less, more preferably 2,000 Pa·s or less, and still more preferably 1,900 Pa·s or less. Although a lower limit of the melt viscosity is not particularly limited, it is preferably 1,000 Pa·s or more.

A melt tension at 200° C. of the styrene-based resin of the present invention is preferably 350 mN or more, more preferably 400 mN or more, still more preferably 500 mN or more, and especially preferably 600 mN or more.

As mentioned previously, nevertheless the styrene-based resin of the present invention has a high molecular weight as 1,000,000 or more and 5,000,000 or less in terms of the weight average molecular weight Mw', in view of the fact that its degree of long-chain branching per 1,000 styrene units is 0.2 or more, a large number of long branched chains are present in the molecular chain as compared with the conventional branched styrene-based resins. For that reason, it becomes easy to control the melt viscosity at 200° C. and a shear rate of 100 $sec^{-1}$ to 2,100 Pa·s or less, and it becomes easy to control the melt tension at 200° C. to 350 mN or more.

The ratio of the melt tension to the melt viscosity {(melt tension)/(melt viscosity) [mN/(Pa·s)]} is preferably 0.20 or more, more preferably 0.30 or more, and still more preferably 0.40 or more.

<Production Method of Styrene-Based Resin According to First Embodiment>

A method for producing the styrene-based resin of the present invention is not particularly limited so long as it is a production method capable of producing the styrene-based resin without using a polyfunctional monomer such that the weight average molecular weight Mw' as determined by the GPC-MALS method is 1,000,000 or more and 5,000,000 or less, the degree of long-chain branching per 1,000 styrene units is 0.2 or more, and the proportion of the tetrahydrofuran-insoluble matter is 0.1% by weight or less (including 0), and various methods are adopted.

The conventional styrene-based resins having a branched structure were produced by performing polymerization of the styrene monomer in the presence of a large amount of the polyfunctional monomer. However, according to such a polymerization method, a portion where the polyfunctional monomer is polymerized becomes excessively high in the molecular weight, and a styrene-based resin having a lot of branched chains on the high-molecular weight side is easily obtained. Therefore, even if a branched structure is introduced, it becomes hard to increase the melt tension of the styrene-based resin to a fixed level or higher.

In order to produce a more highly branched styrene-based resin, if the addition amount of the polyfunctional monomer is increased, the polyfunctional monomers come close to each other within the reaction system, so that gelation is liable to occur during the polymerization. Therefore, the addition amount of the polyfunctional monomer is limited, and it is difficult to produce a styrene-based resin having a high melt tension while holding the fluidity.

According to the following method, a styrene-based resin having a high molecular weight and a high-degree long-chain branched structure can be produced without using a polyfunctional monomer.

That is, the preferred method for producing the styrene-based resin according to the first embodiment of the present invention includes a dispersing step of dispersing a seed particle containing a styrene-based resin in an aqueous medium;

an impregnation step of adding a polymerization initiator containing an organic peroxide and a styrene monomer in the aqueous medium, thereby impregnating the polymerization initiator and the styrene monomer in the seed particle at a temperature at which polymerization of the styrene monomer does not substantially proceed;

a polymerization commencing step of subjecting the aqueous medium to temperature rise, thereby commencing polymerization of the styrene monomer; and an additional impregnation polymerization step of additionally adding the styrene monomer in the aqueous medium, thereby graft polymerizing the styrene monomer on the styrene-based resin while impregnating the styrene monomer in the seed particle, wherein it is preferred that the addition amount of the styrene monomer in the impregnation step is 3 to 25 parts by weight based on 100 parts by weight of the total addition amount of the seed particle and the styrene monomer, and the addition amount of the styrene monomer in the additional impregnation polymerization step is 50 to 90 parts by weight based on 100 parts by weight of the sum total of the total addition amount of the seed particle and the styrene monomer, and the content of the styrene monomer in the seed particle in the additional impregnation polymerization step is held at 10% by weight or less.

The aforementioned production method may further include other step, such as a step of washing the resulting styrene-based resin.

The aforementioned production method mainly includes a dispersing step of dispersing the seed particle in the aqueous medium; an impregnation step of impregnating the polymerization initiator and the styrene monomer in the seed particle; a polymerization commencing step of commencing polymerization of the styrene monomer; and an additional impregnation polymerization step of additionally adding the styrene monomer in the aqueous medium to impregnate in the seed particle, thereby graft polymerizing the styrene monomer on the styrene-based resin. In the present invention, in the additional impregnation polymerization step, by holding the concentration of the styrene monomer within the seed particle serving as a reaction field of the polymerization at a specified concentration, the styrene-based resin having a weight average molecular weight Mw' as determined by the GPC-MALS method of 1,000,000 or more and a degree of long-chain branching of 0.2 or more per 1,000 styrene units can be obtained without using a polyfunctional monomer.

In the dispersing step, it is preferred to disperse the seed particle containing the styrene-based resin in the aqueous medium.

A dispersing method of the seed particle in the aqueous medium is not particularly limited, and for example, a suspending agent and optionally, a surfactant may be added in the aqueous medium and mixed together with the seed particle.

The styrene-based resin according to the first embodiment of the present invention can also be produced by a production method of a styrene-based resin according to a second embodiment as mentioned later.

Second Embodiment

<Production Method of Styrene-Based Resin>

The production method of a styrene-based resin according to the second embodiment of the present invention (hereinafter occasionally referred to as "production method of the present invention) includes a dispersing step of dispersing a seed particle containing a styrene-based resin in an aqueous medium;

an impregnation step of adding a polymerization initiator containing an organic peroxide and a styrene monomer in the aqueous medium, thereby impregnating the polymerization initiator and the styrene monomer in the seed particle at a temperature at which polymerization of the styrene monomer does not substantially proceed;

a polymerization commencing step of subjecting the aqueous medium to temperature rise, thereby commencing polymerization of the styrene monomer; and an additional impregnation polymerization step of additionally adding a styrene monomer in the aqueous medium, thereby graft polymerizing the styrene monomer on the styrene-based resin while impregnating the styrene monomer in the seed particle, wherein the addition amount of the styrene monomer in the impregnation step is 10 to 200 parts by weight based on 100 parts by weight of the seed particle, and the addition amount of the styrene monomer in the additional impregnation polymerization step is 50 to 700 parts by weight based on 100 parts by weight of the seed particle, and the content of the styrene monomer in the seed particle in the additional impregnation polymerization step is held at 10% by weight or less.

The production method of the present invention may further include other step, such as a step of washing the resulting styrene-based resin.

As a means for improving the melt tension of the styrene-based resin, an increase of the molecular weight of the resin is useful. However, there was involved such a problem that when simply increasing the molecular weight, the fluidity of the resin in a molten state is lowered, and the molding processability is deteriorated. As a means for improving the melt tension while holding the fluidity of the resin at the time of melting, introduction of a branched structure into a molecular chain is useful. In the resin having a branched structure, a degree of entanglement of the molecular chains with each other becomes large, and therefore, the melt tension becomes high, and breakage hardly occurs at the time of stretching processing. As a method for incorporating the branched structure into the molecular chain of the styrene-based resin, there is a method for performing polymerization of a styrene monomer in the presence of, as a branching agent, a polyfunctional monomer, such as divinylbenzene. However, in such a polymerization method, there was involved such a problem that branching points are converged in a portion where the polyfunctional monomer is polymerized, so that a microgel is liable to be formed. In order to produce a more highly branched styrene-based resin, when increasing the addition amount of the polyfunctional monomer, the polyfunctional monomers come close to each other within the reaction system, so that gelation is liable to occur during the polymerization. Therefore, the addition amount of the branching agent was limited, and it was difficult to produce a styrene-based resin having a high melt tension while holding the fluidity at the time of melting.

In contrast, the reason why when the production method of the present invention includes the aforementioned constitution, a styrene-based resin having high melt tension and excellent fluidity can be produced is not elucidated yet, the following may be conjectured.

The production method of the present invention mainly includes a dispersing step of dispersing the seed particle in the aqueous medium; an impregnation step of impregnating the polymerization initiator and the styrene monomer in the seed particle; a polymerization commencing step of commencing polymerization of the styrene monomer; and an additional impregnation polymerization step of additionally adding a styrene monomer in the aqueous medium to impregnate in the seed particle, thereby graft polymerizing the styrene monomer on the styrene-based resin. According to the production method of the present invention, it may be considered that in the additional impregnation polymerization step, by holding the concentration of the styrene monomer within the seed particle serving as a reaction field of the polymerization at a specified concentration, while making the number of branching points of the styrene-based resin high (high degree of branching), the molecular weight can be made high, and the branching points can be made away from each other.

In general, the polymerization initiator and a lot of the styrene monomer exist in the reaction field, and an initiator radical formed from the polymerization initiator or a propagating terminal radical of the polymer chain preferentially reacts with a vinyl group of the styrene monomer, and therefore, it may be considered that a linear styrene-based resin is liable to be formed.

On the other hand, in the case where the concentration of the styrene monomer in the reaction field is low, it may be considered that not only a polymerization reaction between the initiator radical or the propagating terminal radical of the polymer chain and the styrene monomer, but also a hydrogen abstraction reaction of the polymer chain owing to the initiator radical is liable to occur. As a result, it may be considered that the styrene monomer is graft polymerized with the radical on the polymer chain formed due to the hydrogen abstraction reaction, or the propagating terminal radical of the polymer chain is recombined, whereby the branched chain is formed in the polymer chain. Furthermore, in view of the fact that the position at which the branched chain is formed in the polymer chain is in the three-dimensionally crowded state, it may be considered that a further branched chain is hardly formed in the vicinity of the formed branching point. Namely, it may be considered that a hydrogen abstraction reaction again occurs on the polymer chain far from the branching point to an extent that no steric hindrance is generated, and the branched chain is formed. For that reason, it may be considered that the branched chain is formed while the branching points are appropriately away from each other, and therefore, the styrene-based resin having a lot of branched chains is obtained without causing gelation.

In the light of the above, it may be considered that in accordance with the production method of the present invention, the styrene-based resin having a lot of branched chains and having a high molecular weight can be produced while suppressing gelation, and therefore, the styrene-based resin in which not only the melt tension is high, but also the fluidity at the time of melting is held can be produced.

Each of the steps of the production method is hereunder described in detail.

[Dispersing Step]

In the dispersing step in the production method of the present invention, the seed particle containing the styrene-based resin is dispersed in the aqueous medium.

A dispersing method of the seed particle in the aqueous medium is not particularly limited, and for example, a suspending agent and optionally, a surfactant may be added in the aqueous medium and mixed together with the seed particle.

(Seed Particle)

The seed particles contain the styrene-based resin.

Examples of the styrene-based resin include a homopolymer of a styrene monomer, a copolymer of a styrene monomer and other monomer, and a mixture of two or more thereof. The amount of the structural unit derived from the styrene monomer to be contained in the copolymer is 50% by weight or more, preferably 60% by weight or more, and more preferably 80% by weight or more.

Specifically, examples of the styrene-based resin include a polystyrene, a rubber-modified polystyrene (high-impact polystyrene), a styrene-acrylonitrile copolymer, a styrene-acrylic acid copolymer, a styrene-methacrylic acid copolymer, a styrene-methyl methacrylate copolymer, and a styrene-maleic anhydride copolymer. The styrene-based resin may be used either alone or in combination of two or more thereof. Of these, from the standpoint of readily causing a hydrogen abstraction reaction and readily forming a branched chain, the styrene-based resin is preferably a polystyrene.

Although the seed particle may contain other resin than the styrene-based resin, it contains the styrene-based resin in an amount of preferably 70% by weight or more, and more preferably 85% by weight or more. Still more preferably, the seed particle is composed of only the styrene-based resin.

An average particle diameter of the seed particle is preferably 0.3 to 1.2 mm. In the case where the average particle diameter of the seed particles is 0.3 mm or more, the generation amount of fine particles which may be generated at the time of producing a branched styrene-based resin can be decreased. In the case where the average particle diameter of the seed particles is 1.2 mm or less, a specific surface area of the seed particle becomes large, and impregnation properties of the styrene monomer in the seed particle are improved. The upper limit of the average particle diameter of the seed particles is more preferably 1.0 mm, and still more preferably 0.5 mm.

The average particle diameter of the seed particles means a 63% volume average particle diameter.

(Aqueous Medium)

In general, though water, such as deionized water, is used as the aqueous medium, the aqueous medium may contain a water-soluble organic solvent, such as an alcohol, within a range where the seed particle is not dissolved.

(Surfactant)

Examples of the surfactant include an anionic surfactant, a cationic surfactant, an ampholytic surfactant, and a nonionic surfactant. Of these, the surfactant is preferably at least one selected from the group consisting of an anionic surfactant, a cationic surfactant, and a nonionic surfactant. Specifically, examples of the surfactant include an alkyl sulfonic acid salt (for example, sodium dodecyl sulfonate), an alkylbenzene sulfonic acid salt (for example, sodium dodecyl benzene sulfonate), a polyoxyalkyl ether phosphoric acid ester, an alkyl dimethylethyl ammonium ethyl sulfate, a higher alcohol, a glycerin fatty acid ester, a sorbitan fatty acid ester, a polyoxyethylene alkyl ether, and a fatty acid salt.

The surfactant may be used either alone or in combination of two or more thereof.

Furthermore, an electrolyte, for example, lithium chloride, potassium chloride, sodium chloride, sodium sulfate, sodium nitrate, sodium carbonate, sodium bicarbonate, sodium acetate, and sodium succinate, may be used together with the surfactant.

(Suspending Agent)

Examples of the suspending agent include hydrophilic polymers, such as polyvinyl alcohol, methyl cellulose, and polyvinylpyrrolidone; poorly water-soluble inorganic salts, such as tricalcium phosphate, magnesium nitrate, magnesium pyrophosphate, hydroxy apatite, aluminum oxide, talc, kaolin, and bentonite.

The suspending agent may be used either alone or in combination of two or more thereof. Either one or both of the hydrophilic polymer and the poorly water-soluble inorganic salt may be used.

In the case of using the poorly water-soluble inorganic salt as the suspending agent, it is preferred to jointly use an anionic surfactant, such as a sodium alkyl sulfonate and a sodium alkylbenzene sulfonate.

The addition amount of the suspending agent is preferably 0.01 to 5 parts by weight based on 100 parts by weight of the sum total of the total addition amount of the seed particle and the styrene monomer. In the case of using the suspending agent composed of a poorly water-soluble inorganic salt jointly with the anionic surfactant, it is preferred to use the suspending agent in an amount of 0.05 to 3 parts by weight and the anionic surfactant in an amount of 0.0001 to 0.5 parts by weight based on 100 parts by weight of the sum total of the total addition amount of the seed particle and the styrene monomer.

[Impregnation Step]

In the impregnation step, the polymerization initiator containing an organic peroxide and a styrene monomer are added in the aqueous medium having the seed particle dispersed therein, thereby impregnating the polymerization initiator and the styrene monomer in the seed particle at a temperature at which polymerization of the styrene monomer does not substantially proceed.

Here, the "temperature at which polymerization of the styrene monomer does not substantially proceed" is a temperature at which the organic peroxide is not substantially decomposed. From the viewpoint of suppressing the decomposition of the organic peroxide, when a 10-hour half-life temperature of the organic peroxide is defined as $T_{1/2}$, the temperature of the aqueous medium in the impregnation step is controlled to preferably $(T_{1/2}-15)$° C. or lower, and more preferably $(T_{1/2}-18)$° C. or lower. From the viewpoint of impregnation properties of the styrene monomer in the seed particle, the temperature of the aqueous medium in the impregnation step is controlled to preferably 70° C. or higher, and more preferably 75° C. or higher.

The temperature of the aqueous medium in the impregnation step may be made constant within the aforementioned range or may be changed by, for example, a gradual increase.

From the viewpoint of thoroughly impregnating the styrene monomer and the polymerization initiator in the seed particle, the time of the impregnation step is preferably about 0.5 to 2.0 hours, and more preferably 1.0 to 2.0 hours.

In the impregnation step, in the case where the addition amount of the styrene monomer falls within the aforementioned range, the seed particle can be sufficiently plasticized, and not only the polymerization initiator can be readily sufficiently impregnated in the seed particle, but also the generation of fine particles resulting from polymerization of the styrene monomer outside the seed particle can be suppressed.

In the production method of the present invention, the addition amount of the styrene monomer in the impregnation step is 10 to 200 parts by weight, preferably 20 to 200 parts by weight, more preferably 30 to 180 parts by weight, and still more preferably 40 to 160 parts by weight based on 100 parts by weight of the seed particle. In the impregnation step, in the case where the addition amount of the styrene monomer is excessively low, the seed particle cannot be sufficiently plasticized, and the polymerization initiator cannot be sufficiently impregnated in the seed particle. On the other hand, in the case where the addition amount of the styrene monomer is excessively high, the styrene monomer is polymerized outside the seed particle, whereby fine particles are liable to be formed. In particular, in order to produce the styrene-based resin of the present invention, the addition amount of the styrene monomer in the impregnation step is preferably 3 to 25 parts by weight, and more preferably 5 to 20 parts by weight based on 100 parts by weight of the sum total of the total addition amount of the seed particle and the styrene monomer.

(Polymerization Initiator)

In the production method of the present invention, the polymerization initiator contains an organic peroxide.

Examples of the organic peroxide include benzoyl peroxide, dilauroyl peroxide, t-butyl peroxy-2-ethylhexanoate, t-butyl peroxyisobutyrate, t-hexyl peroxy-2-ethylhexanoate, t-amylperoxy-2-ethyl hexanoate, 1-cyclohexyl-1-methylethylperoxy-2-ethyl hexanoate, 1,1,3,3-tetramethylbutylperoxy-2-ethyl hexanoate, 2,5-dimethyl-2,5-bis(2-ethylhexanoylperoxy)hexane, t-butylperoxyisopropyl monocarbonate, t-butylperoxy-2-ethylhexyl monocarbonate, t-butylperoxybenzoate, t-amylperoxyisopropyl carbonate, t-amylperoxy-2-ethylhexyl carbonate, t-hexylperoxyisopropyl carbonate, 1-butylperoxy-3,5,5-trimethyl hexanoate, 1,1-bis(t-butylperoxy)-3,3,5-trimethylcycloxane, 1,1-bis(t-butylperoxy)-2-methylcyclohexane, 1,1-bis(t-butylperoxy)cyclohexane, 1,1-bis(t-butylperoxy)cyclododecane, 2,2-bis(t-butylperoxy)butane, 1,1-bis(t-hexylperoxy)-3,3,5-trimethylcyclohexane, 1,1-bis(t-hexylperoxy) cyclohexane, and 2,2-bis(4,4-di-t-butylperoxycyclohexyl) propane.

These organic peroxides may be used either alone or in combination of two or more thereof.

As the polymerization initiator, an organic peroxide having a 10-hour half-life temperature $T_{1/2}$ of 85 to 120° C. is preferably used, and one having a 10-hour half-life temperature $T_{1/2}$ of 90 to 110° C. is more preferably used. In the case of using two or more organic peroxides as the polymerization initiator, the 10-hour half-life temperature of the organic peroxide having a lowest 10-hour half-life temperature is defined as $T_{1/2}$. In addition, as the organic peroxide, one which is satisfied with the these temperature ranges and has a high hydrogen abstraction capability, for example, an organic peroxide capable of generating a t-butoxy radical, such as t-butylperoxyisopropyl monocarbonate, t-butylperoxy-2-ethylhexyl monocarbonate, and t-butyl peroxybenzoate, and an organic peroxide capable of generating a cumyloxy radical, such as dicumyl peroxide, is more preferably used.

Although the polymerization initiator may contain other polymerization initiator than the organic peroxide, from the viewpoint of making it easy to cause the hydrogen abstraction reaction, the polymerization initiator contains the organic peroxide in an amount of preferably 70% by weight or more, and more preferably 85% by weight or more. Still more preferably, the polymerization initiator is composed of only the organic peroxide.

The addition amount of the polymerization initiator is preferably 0.1 to 2.0 parts by weight based on 100 parts by weight of the sum total of the total addition amount of the seed particle and the styrene monomer. In the case where the addition amount of the polymerization initiator falls within this range, the productivity is not excessively lowered, and the hydrogen abstraction reaction is readily caused. The addition amount of the polymerization initiator is more preferably 0.2 to 1.5 parts by weight based on 100 parts by weight of the sum total of the total addition amount of the seed particle and the styrene monomer.

(Oxygen Concentration in Aqueous Medium)

As the aqueous medium, it is preferred to use an aqueous medium having an oxygen concentration at 30° C. of 4 mg/L or more. The oxygen of the aqueous medium functions as a polymerization inhibitor in the aqueous medium, to impair the generation of fine particles. In consequence, as the oxygen concentration in the aqueous medium is high, the yield of the styrene-based resin is improved. The oxygen concentration at 30° C. is more preferably 5 mg/L or more.

By adding a water-soluble polymerization inhibitor, for example, sodium nitrite, in an amount of 30 to 200 ppm to the aqueous medium, the generation of fine particles can also be suppressed.

[Polymerization Commencing Step]

In the polymerization commencing step in the production method according to the second embodiment of the present invention, the aqueous medium in which the seed particle having the polymerization initiator and the styrene monomer impregnated therein is dispersed is subjected to temperature rise, thereby commencing polymerization of the styrene monomer. Specifically, it is preferred to control the temperature of the aqueous medium to a temperature at which the organic peroxide is substantially decomposed, thereby commencing polymerization of the styrene monomer. From the viewpoint of productivity, the temperature of the aqueous medium is controlled to a temperature of preferably $(T_{1/2}-10)$° C. or higher, and more preferably $(T_{1/2}-5)$° C. or higher.

Although the temperature rise time to the aforementioned temperature is not particularly limited, it is preferably 3 hours or more, and more preferably 5 hours or more from the standpoint that the polymerization of the styrene monomer in the core particle is allowed to proceed during the temperature rise of the aqueous medium; and that it is easy to control the content of the styrene monomer in the seed particle to 10% by weight or less in the additional impregnation polymerization step as mentioned later. On the other hand, from the viewpoint of productivity, the temperature rise time to the aforementioned temperature is preferably within 10 hours.

[Additional Impregnation Polymerization Step]

In the additional impregnation polymerization step in the production method of the present invention, in the aqueous medium, namely, in the aqueous medium containing the seed particle in which polymerization of the styrene monomer has commenced within the seed particle after passing through the polymerization commencing step, the styrene monomer is additionally added to impregnate the styrene monomer in the seed particle, thereby undergoing polymerization. On this occasion, in the additional impregnation polymerization step, the addition amount of the styrene monomer is 50 to 700 parts by weight based on 100 parts by weight of the seed particle. Then, the styrene monomer is intermittently or continuously added to the aqueous medium such that the content (concentration) of the styrene monomer in the seed particle in the additional impregnation polymerization step is held to 10% by weight or less.

In order to produce the styrene-based resin of the present invention, in the additional impregnation polymerization step, the addition amount of the styrene monomer is preferably 50 to 90 parts by weight, and more preferably 55 to 85 parts by weight based on 100 parts by weight of the sum total of the total addition amount of the seed particle and the styrene monomer. Then, it is preferred to intermittently or continuously add the styrene monomer to the aqueous medium such that the content (concentration) of the styrene monomer in the seed particle in the additional impregnation polymerization step is held to 10% by weight or less.

After passing through the polymerization commencing step, the styrene monomer commences the polymerization while allowing the inside of the seed particle to act as the reaction field. In the additional impregnation polymerization step, in the case where the content of the styrene monomer in the seed particle is held to 10% by weight or less, not only polymerization among the styrene monomers but also graft polymerization of the styrene monomer on the styrene-based resin is readily caused, whereby a branched chain is formed owing to the graft polymerization.

In a range where the object and effects of the present invention are not impaired, the content of the styrene monomer in the seed particle in the additional impregnation polymerization step can exceed 10% by weight. The time at which the content of the styrene monomer in the seed particle exceeds 10% by weight is preferably 20% or less, and more preferably 10% or less of the time of the additional impregnation polymerization step. It is most preferred to control the content of the styrene monomer in the seed particle to 10% by weight or less over the entirety of the additional impregnation polymerization step. From the viewpoint of highly forming the branched chain, the time of the additional impregnation polymerization step is preferably 150 minutes or more, and more preferably 180 minutes or more. From the viewpoint of production efficiency, an upper limit of the time of the additional impregnation polymerization step is preferably about 600 minutes.

The content of the styrene monomer in the seed particle in the additional impregnation polymerization step is preferably 8% by weight or less, and more preferably 6% by weight or less.

It is possible to calculate the content of the styrene monomer in the seed particle in the additional impregnation polymerization step on a basis of chemical characteristics of the polymerization initiator to be used for polymerization, a polymerization rate of styrene determined from the polymerization temperature, and so on. In the case where timing and addition rate (addition proportion) of additional addition of the styrene monomer are regulated on a basis of the calculated values so as to attain the desired content of the styrene monomer, the content of the styrene monomer in the seed particle in the additional impregnation polymerization step can be regulated. In addition, the content of the styrene monomer in the actual seed particle can be determined by extracting the seed particle during the polymerization from the reaction system and adopting a method as mentioned later.

It may be considered that as the content of the styrene monomer in the seed particle is low, not only the polymerization reaction but also the hydrogen abstraction reaction is readily caused, whereby the degree of branching of the styrene-based resin is improved. In addition, in the case where the ratio of the styrene monomer to the seed particle is high, the absolute molecular weight and degree of branching of the styrene-based resin are readily improved.

As mentioned previously, it may be considered that in the case where the average particle diameter of the seed particles is controlled to 1.2 mm or less, the specific surface area of the seed particle becomes large, the impregnation properties of the styrene monomer are improved, and branching is readily formed.

Although a temperature condition of the additional impregnation polymerization step is not particularly limited, from the viewpoint of making it easy to cause the hydrogen abstraction reaction, the temperature of the aqueous medium in the additional impregnation polymerization step is preferably $(T_{1/2}-10)$° C. to $(T_{1/2+20})$° C., and more preferably $(T_{1/2}-5)$° C. to $(T_{1/2}+10)$° C.

The temperature of the aqueous medium in the additional impregnation polymerization step may be made constant within the aforementioned range or may be changed by, for example, a gradual increase.

In the additional impregnation polymerization step, the addition amount of the styrene monomer is 50 to 700 parts by weight based on 100 parts by weight of the seed particle. In the additional impregnation polymerization step, when the addition amount of the styrene monomer is excessively low, it is difficult to sufficiently form the branched chain. In addition, when the addition amount of the styrene monomer is excessively high, there is a concern that the styrene monomers are liable to be polymerized with each other outside the seed particle, and the yield of the styrene-based resin is worsened.

In the additional impregnation polymerization step, the addition amount of the styrene monomer is more preferably 100 to 600 parts by weight, and still more preferably 200 to 550 parts by weight based on 100 parts by weight of the seed particle.

(Chain Transfer Agent)

In the additional impregnation polymerization step, it is preferred to hold the concentration of the styrene monomer in the seed particle serving as a reaction field of the polymerization to a specified range, thereby polymerizing the styrene monomer in the presence of a chain transfer agent. Furthermore, it is preferred to regulate the ratio of the total addition amount of the chain transfer agent to the total addition amount of the polymerization initiator within a predetermined range. According to this, it is possible to more increase the number of branching points of the styrene-based resin to increase the degree of branching and to make the molecular weight high. Furthermore, it may be considered that by widening the distance between the branching points to increase the degree of long-chain branching, gelation can be prevented from occurring, and the fluidity can be enhanced.

In the reaction field at the time of polymerization, the chain transfer agent is a molecule capable of causing a chain transfer reaction of a radical-reactive molecule, such as a propagating terminal radical of the polymer chain, a radical on the polymer chain, a styrene monomer radical, and an initiator radical.

Examples of the chain transfer agent which is used include an α-methylstyrene dimer, n-octyl mercaptan, t-nonyl mercaptan, n-dodecyl mercaptan, t-dodecyl mercaptan, phenyl thiol, cyclohexane thiol, 4,4'-thiobisbenzene thiol, trimethylolpropane tris(3-mercaptopropionate), pentaerythritol tetrakis(3-mercaptopropionate), 4-methylbenzene thiol, isooctyl 3-mercaptopropionate, 1,8-dimercapto-3,6-dioxaoctane, bromotrichloromethane, carbon tetrachloride, 1,4-naphthoquinone, 2,4-diphenyl-4-methyl-1-pentene, and pentaphenylethane. An α-methylstyrene dimer is preferably used as the chain transfer agent because the styrene-based resin which is low in an offensive smell and free from coloration can be obtained.

As mentioned above, in general, in the reaction field at the time of polymerization of the styrene monomer, the polymerization initiator and a lot of the styrene monomer exist, and an initiator radical formed from the polymerization initiator or a propagating terminal radical of the polymer chain preferentially reacts with a vinyl group of the styrene monomer, and therefore, it may be considered that a linear styrene-based resin is liable to be formed. On the other hand, in the case where the concentration of the styrene monomer in the reaction field is low as in the aforementioned additional impregnation polymerization step, the number of polymer chains relatively increases, and therefore, it may be considered that not only a polymerization reaction between the initiator radical or the propagating terminal radical of the polymer chain and the styrene monomer, but also a hydrogen abstraction reaction of the polymer chain owing to the initiator radical is liable to occur. As a result, it may be considered that the styrene monomer is graft polymerized with the radical on the polymer chain formed due to the hydrogen abstraction reaction, or the propagating terminal radical of the polymer chain is recombined, whereby the branched chain is formed in the polymer chain.

In view of the fact that the position at which the branched chain is formed in the polymer chain is in the three-dimensionally crowded state, it may be considered that a further branched chain is hardly formed in the vicinity of the formed branching point. Namely, it may be considered that a hydrogen abstraction reaction again occurs on the polymer chain far from the branching point to an extent that no steric hindrance is generated, and the branched chain is formed thereon. In consequence, it may be considered that the branched chain is formed while the branching points are appropriately away from each other, and therefore, the styrene-based resin having a lot of branched chains is obtained without causing gelation.

In order to form a lot of branched chains, it is needed to increase the radical concentration in the polymerization system in the additional impregnation polymerization step, thereby increasing the frequency of generation of the hydrogen abstraction reaction on the polymer chain. However, when concentration of the initiator radical having high reactivity is increased by increasing the addition amount of the polymerization initiator, increasing the temperature of the aqueous medium in the additional impregnation polymerization step to promote decomposition of the polymerization initiator, or other means, an undesired side reaction, such as a cleavage reaction of the polymer chain, is liable to occur, and it is difficult to obtain the styrene-based resin having a desired branched structure.

On the other hand, in the radical polymerization, the chain transfer agent is used for the purpose of regulating the molecular weight of the polymer chain to a low level, and in general, it is not used for the purpose of synthesizing a high-molecular weight polymer chain. However, the present inventors have found that by regulating the ratio of the total addition amount of the chain transfer agent to the total addition amount of the polymerization initiator within a predetermined range, a high-molecular styrene-based resin which does not cause a lowering of the molecular weight and conversely has a high degree of branching is formed.

As for the aforementioned reason, the following may be considered. That is, in the case where in the specified range of the concentration of the styrene monomer in the seed particle, the ratio of the total addition amount of the chain transfer agent to the total addition amount of the polymerization initiator is regulated within a predetermine range, a part of the radical having high reactivity, such as the initiator radical, is replaced by a radical having appropriately low reactivity owing to the chain transfer reaction, and a high-molecular weight styrene-based resin having a high degree of branching is formed owing to the hydrogen abstraction reaction of the polymer chain while suppressing a side reaction, such as a cleavage reaction of the polymer chain.

Originally, the chain transfer agent forms a low-molecular weight polymer, and therefore, it may be considered that the styrene-based resin having a low molecular weight is also formed by a part of the chain transfer agent which has not participated to the formation of the branched chain. As a result, the high-molecular weight styrene-based resin having a high degree of branching, which has been formed owing to the hydrogen abstraction reaction, and the low-molecular weight styrene-based resin which has been formed owing to the chain transfer reaction are simultaneously formed, and therefore, it may be considered that the molecular weight distribution of the styrene-based resin is widened, whereby the styrene-based resin having a branched chain, which is provided with both high melt tension and high fluidity, can be produced.

The chain transfer agent may coexist together with the styrene monomer in the additional impregnation polymerization step. From the viewpoint of more enhancing the fluidity while maintaining the high melt tension, a ratio of a total addition amount Mt of the chain transfer agent to a total addition amount Mi of the polymerization initiator (namely, Mt/Mi) is preferably controlled to 0.1 to 0.6. The lower limit of Mt/Mi is more preferably 0.12, and still more preferably 0.15. Meanwhile, the upper limit of Mt/Mi is preferably 0.5, and more preferably 0.4.

Although the addition method of the chain transfer agent is not limited, examples thereof include the following (I) to (IV). The chain transfer agent is added by at least one method of (I) to (IV).

(I) A method of containing the chain transfer agent in the seed particle prior to the dispersing step (II) A method of impregnating the chain transfer agent in the seed particle in the impregnation step (III) A method of impregnating the chain transfer agent in the seed particle in the polymerization commencing step (IV) A method of impregnating the chain transfer agent in the seed particle in the additional impregnation polymerization step In the case of (I), the chain transfer agent can be contained in the seed particle prior to adding the seed particle in the aqueous medium. Specifically, the styrene-based resin and the chain transfer agent are blended to produce the seed particle by means of granulation. According to this, the seed particle containing the chain transfer agent is obtained.

In the case of (II), the chain transfer agent can be impregnated in the seed particle in the impregnation step. The chain transfer agent can be impregnated in the seed particle by adding in the aqueous medium in the impregnation step. The chain transfer agent may be added in the aqueous medium at a timing the same as or different from that in the styrene monomer or the polymerization initiator. It is preferred to add the chain transfer agent in the aqueous medium together with the styrene monomer and the polymerization initiator. In this case, in the impregnation step, the chain transfer agent is sufficiently dispersed in the seed particle together with the styrene monomer and the polymerization initiator. In consequence, in the polymerization commencing step or additional impregnation polymerization step, both suppression of a side reaction, such as a cleavage reaction of the polymer chain, and generation of a hydrogen abstraction reaction of the polymer chain can be made compatible with each other, and the degree of long-chain branching of the styrene-based resin can be sufficiently increased.

In the case of (III), the chain transfer agent can be impregnated in the seed particle in the polymerization commencing step. The timing of adding the chain transfer agent to the aqueous medium may be during or after temperature rise of the aqueous medium.

In the case of (IV), the chain transfer agent can be impregnated in the seed particle in the additional impregnation polymerization step. Specifically, after the polymerization commencing step, the chain transfer agent can be impregnated in the seed particle while controlling the content of the styrene monomer in the seed particle to 10% by weight or less and while additionally adding the styrene monomer in the aqueous medium. The timing of adding the chain transfer agent in the aqueous medium is not particularly limited so long as the object and effects of the present invention are not impaired. For example, the chain transfer agent may be added altogether at the initial stage of the additional impregnation polymerization step and may be added at a predetermined addition rate. In addition, the addition rate may be changed by, for example, a gradual decrease. In the additional impregnation polymerization step, in the case of adding the chain transfer agent in the aqueous medium, for example, it is preferred to mix the styrene monomer and the chain transfer agent and then add the mixture.

Among (I) to (IV), it is preferred to impregnate the chain transfer agent in the seed particle in the impregnation step as in (II). In this case, the chain transfer agent can be allowed to exist in the vicinity of the polymerization initiator in the seed particle prior to the polymerization commencing step. Thus, a part of the radical having high reactivity as generated in the polymerization commencing step or the additional impregnation polymerization step can be replaced by a radical having appropriately low reactivity owing to the chain transfer reaction, prior to causing a side reaction, such as a cleavage reaction of the polymer chain. As a result, the styrene-based resin having a branched chain, which has a wider molecular weight distribution and a higher degree of branching and is provided with both high melt tension and high fluidity in a high dimension, can be obtained.

The production method of the present invention is a method in which the styrene-based resin having a high degree of branching can be obtained without using a polyfunctional monomer (branching agent). However, the polyfunctional monomer may be added to the aqueous medium so long as the gelation is not caused at the time of polymerization. The addition amount of the polyfunctional monomer in the aqueous medium is preferably 0.2 parts by weight or less, more preferably 0.1 parts by weight or less, still more preferably 0.005 parts by weight, and especially preferably 0 part by weight based on 100 parts by weight of the sum total of the seed particle and the styrene-based monomer. That is, it is especially preferred that the polyfunctional monomer is not used. In the case where the polyfunctional monomer is not used, the styrene-based resin having a higher degree of branching can be obtained.

In addition to the additional impregnation polymerization step, the aforementioned production method may further include a residual polymerization step of after the additional impregnation polymerization step, polymerizing the remaining styrene monomer in the styrene-based resin particle; a washing step of washing the suspending agent, the surfactant, and the like as attached to the resulting styrene-based resin, with water or the like; a coating step of coating a functional component, such as an antistatic agent, on the surface of the styrene-based resin; and so on.

EXAMPLES

Next, the present invention is described in detail by reference to Examples, but it should be construed that the present invention is by no means limited by these Examples. All "parts" and "%" are on a weight basis unless particularly indicated. The temperature within the autoclave means a temperature of the aqueous medium.

[Preparation of Seed Particle (Core Particle)]

Production Example 1

In an autoclave having an internal volume of 1 $m^3$ and equipped with a stirring device, 350 kg of deionized water, 2.1 kg of tricalcium phosphate (20.5% slurry, manufactured by Taihei Chemical Industrial Co., Ltd.) as a suspending agent, 0.158 kg of sodium dodecylbenzenesulfonate (10% aqueous solution) and 0.053 kg of disodium dodecyldiphenyl ether sulfonate (10% aqueous solution of "PELEX SSH", manufactured by Kao Corporation) as surfactants, and 0.535 kg of sodium acetate as an electrolyte were supplied.

Subsequently, 0.975 kg of t-butyl peroxy-2-ethylhexanoate ("PERBUTYL O", manufactured by NOF Corporation) and 0.284 kg of t-butylperoxy-2-ethylhexyl monocarbonate ("TRIGONOX 117", manufactured by Kayaku Akzo Corporation) as polymerization initiators and 15.4 g of 4-tert-butyl catechol as a polymerization inhibitor were dissolved in 390 kg of styrene, and the solution was supplied in the autoclave while stirring at 110 rpm. After purging the inside of the autoclave with nitrogen, temperature rise of the inside of the autoclave was commenced, and the temperature was raised to 90° C. over 1 hour and 15 minutes. During the temperature rise of the temperature in the inside of the autoclave to 90° C., at the point of time of reaching 60° C., 1.95 g of potassium persulfate as a suspension aid was charged in the autoclave.

After the temperature in the autoclave reached 90° C., the temperature was raised to 100° C. over 5 hours. After the temperature in the autoclave reached 100° C., the temperature was raised to 115° C. over 1 hour and 30 minutes. The temperature in the autoclave was held at 115° C. for 2 hours and 40 minutes, followed by cooling to 40° C. over 2 hours.

After cooling the inside of the autoclave, the tripotassium phosphate attached onto the surface of the styrene-based resin particle taken out from the inside of the autoclave was dissolved with nitric acid; thereafter, the particle was washed with water and then dehydrated with a centrifuge; and the moisture attached onto the surface of the particle was further removed with a flash dryer, thereby obtaining a styrene-based resin particle.

The resulting styrene-based resin particle was sieved, and a particle having a diameter of 0.5 to 1.3 mm (average particle diameter: 0.8 mm) was taken out and designated as a seed particle 1.

An average particle diameter d63 of the styrene-based resin particle (the aforementioned seed particle 1 as well as a seed particle 2 as mentioned later) was measured with a particle size distribution analyzer "MILLITRACK JPA", manufactured by Nikkiso Co., Ltd.

Production Example 2

In an autoclave having an internal volume of 1 $m^3$ and equipped with a stirring device, 380 kg of deionized water, 6.15 kg of tricalcium phosphate (20.5% slurry, manufactured by Taihei Chemical Industrial Co., Ltd.) as a suspending agent, 0.499 kg of sodium dodecylbenzenesulfonate (10% aqueous solution) and 0.166 kg of disodium dodecyldiphenyl ether sulfonate (10% aqueous solution of "PELEX SSH", manufactured by Kao Corporation) as surfactants, and 4 g of potassium persulfate as a suspension aid were supplied.

Subsequently, 0.440 kg of t-butyl peroxy-2-ethylhexanoate ("PERBUTYL O", manufactured by NOF Corporation) and 0.520 kg of t-butylperoxy-2-ethylhexyl monocarbonate ("TRIGONOX 117", manufactured by Kayaku Akzo Corporation) as polymerization initiators were dissolved in 360 kg of styrene, and the solution was supplied in the autoclave while stirring at 110 rpm. After purging the inside of the autoclave with nitrogen, temperature rise of the inside of the autoclave was commenced, and the temperature was raised to 90° C. over 1 hour and 15 minutes.

After the temperature in the autoclave reached 90° C., the temperature was raised to 120° C. over 6 hours. The temperature was held at 120° C. for 3 hours, followed by cooling to 40° C. over 3 hours.

After cooling the inside of the autoclave, the tripotassium phosphate attached onto the surface of the styrene-based resin particle taken out from the inside of the autoclave was dissolved with nitric acid; thereafter, the particle was washed with water and then dehydrated with a centrifuge; and the moisture attached onto the surface of the particle was further removed with a flash dryer, thereby obtaining a styrene-based resin particle.

The resulting styrene-based resin particle was sieved, and a particle having a diameter of 0.3 to 0.5 mm (average particle diameter: 0.4 mm) was taken out and designated as a seed particle 2.

[Production of Styrene-Based Resin]

Example 1

[Dispersing Step]

In an autoclave having an internal volume of 1.5 $m^3$ and equipped with a stirring device, 421 kg of deionized water, 2.63 kg of sodium pyrophosphate, and 6.56 kg of magnesium nitrate were supplied, and magnesium pyrophosphate as a suspending agent was synthesized in the autoclave by means of salt exchange. 0.131 kg of a sodium alkylsulfonate (40% aqueous solution of "LATEMUL PS", manufactured by Kao Corporation) as a surfactant and 112 kg of the styrene-based resin particle (seed particle 1) obtained in Production Example 1 as a seed particle were supplied in the autoclave, and then, the inside of the autoclave was purged with nitrogen. Specifically, the inside of the autoclave was pressurized with nitrogen to 0.3 MPa(G), and thereafter, the gas in the autoclave was released until the pressure in the autoclave reached atmospheric pressure.

[Impregnation Step]

Subsequently, the temperature was raised to 80° C. while stirring the aqueous medium in the autoclave at 50 rpm. After the temperature of the aqueous medium in the autoclave reached 80° C., an emulsion as mentioned later was supplied in the autoclave. Thereafter, the inside of the autoclave was pressurized with nitrogen to 0.1 MPa(G), followed by holding at 80° C. for 1 hour.

The emulsion was one obtained by preparing a mixture of 84 kg of deionized water, 0.171 kg of a sodium alkylsulfonate (40% aqueous solution of "LATEMUL PS", manufactured by Kao Corporation), 80 kg of styrene (styrene monomer), and 1.58 kg of t-butylperoxy-2-ethylhexyl monocarbonate ("TRIGONOX 117", manufactured by Kayaku Akzo Corporation; described as "BE" in the tables, 10-hour half-life temperature $T_{1/2}$: 99.0° C.) by using a homogenizer.

[Polymerization Commencing Step]

Thereafter, the temperature in the autoclave was raised to 105° C. over 2 hours.

[Additional Impregnation Polymerization Step]

After the temperature in the autoclave reached 105° C., the autoclave was held at that temperature for 5.5 hours. Since the temperature in the autoclave reached 105° C., 254 kg of styrene (styrene monomer) was continuously added in the autoclave at a rate of 0.8 kg/min over 5 hours and 10 minutes.

Upon the addition of styrene, a change of styrene content in the seed particle and a change of temperature relative to the lapse time were confirmed through simulation on a basis of the polymerization rate of styrene calculated from the aforementioned addition condition, the chemical characteristics of the polymerization initiator used for the polymerization, and the polymerization temperature. Then, on a basis of the stimulation, the styrene was additionally added in the autoclave such that the styrene content in the seed particle during the addition of styrene was 10% by weight or less.

At each of the time of commencing the additional addition of styrene, the time of lapsing 2.5 hours from commencement of the addition, and the time of completion of additional addition, the styrene content in the styrene-based resin particle was measured by a method as mentioned later ("Measuring method of styrene content in seed particle during addition of styrene monomer in additional impregnation polymerization step"). As a result, the styrene content in the seed particle was 6% by weight in all of the cases.

FIGS. 2 to 17 are each a graph of simulation results in the Examples and Comparative Examples. In each of the graphs, the lapse time [Time (hr)] is plotted on the abscissa; the content of the styrene monomer in the seed particle (core particle) in the additional impregnation polymerization step [Amount of styrene monomer in a seed particle (core particle) (wt %)] is plotted on the left-side ordinate; and the polymerization temperature [Temperature (° C.)] is plotted on the right-side ordinate. In the graphs, the change of styrene content in the seed particle (core particle) relative to the lapse time is expressed by a solid line, and the change of polymerization temperature relative to the lapse time is expressed by a broken line.

[Residual Polymerization Step]

After the additional impregnation polymerization step, the aqueous medium in the autoclave was subjected to temperature rise to 120° C. over 2 hours and then held at 120° C. for 3 hours, thereby polymerizing the unreacted styrene monomer.

[Cooling Step]

After the residual polymerization step, the aqueous medium in the autoclave was cooled to 35° C. over 6 hours.

After cooling the inside of the autoclave, the styrene-based resin particle taken out from the autoclave was washed with dilute nitric acid to dissolve and remove the suspending agent attached onto the surface of the resin particle. Thereafter, the particle was washed with water and then dehydrated with a centrifuge. The resulting particle was coated with 0.01 parts by weight (value based on 100 parts by weight of the styrene-based resin) of polyoxyethylene lauryl ether as an antistatic agent, and then, the moisture attached onto the surface of the resin particle was removed by means of fluidized drying (room-temperature air, 10 minutes).

Example 2

The following were changed from Example 1. Specifically, the seed particle was changed from the coat particle 1 to 66.9 kg of the styrene-based resin particle (seed particle 2) obtained in Production Example 2. In addition, in the additional impregnation polymerization step, the holding time at the temperature in the autoclave of 105° C. was changed to 6 hours and 10 minutes, the amount of styrene to be additionally added was changed to 299 kg, and the styrene was continuously added in the autoclave at a rate of 0.8 kg/min over 6 hours and 10 minutes. At each of the time of commencing the additional addition of styrene monomer, the time of lapsing 2.5 hours from commencement of the addition, and the time of completion of additional addition, the styrene content in the styrene-based resin particle was measured by a method as mentioned later. As a result, the styrene content in the seed particle was 10% by weight at the time of commencing the additional addition of styrene monomer and 6% by weight at each of the time of lapsing 2.5 hours from commencement of the addition and the time of completion of additional addition, respectively.

Example 3

A styrene-based resin was prepared in the same manner as in Example 1, except that after the impregnation step, the temperature in the autoclave was raised from 80° C. to 100° C. over 2 hours; and that the temperature of the additional impregnation polymerization step was changed to 100° C. At each of the time of commencing the additional addition of styrene monomer, the time of lapsing 2.5 hours from commencement of the addition, and the time of completion of additional addition, the styrene content in the styrene-based resin particle was measured by a method as mentioned later. As a result, the styrene content in the seed particle was 10% by weight at the time of commencing the additional addition of styrene monomer, 9% by weight at the time of lapsing 2.5 hours from commencement of the addition, and 8% by weight at the time of completion of additional addition, respectively.

Example 4

The following were changed from Example 1. Specifically, in the dispersing step, the supply amount of the seed particle (seed particle 1) was changed to 183 kg. In addition, in the additional impregnation polymerization step, the holding time at the temperature in the autoclave of 105° C. was changed to 3 hours, the amount of styrene to be additionally added was changed to 103 kg, and the styrene was continuously added in the autoclave at a rate of 0.8 kg/min over 3 hours. At each of the time of commencing the additional addition of styrene monomer, the time of lapsing 2.5 hours from commencement of the addition, and the time of completion of additional addition, the styrene content in the styrene-based resin particle was measured by a method as mentioned later. As a result, the styrene content in the seed particle was 3% by weight at the time of commencing the additional addition of styrene monomer and 5% by weight at each of the time of lapsing 2.5 hours from commencement of the addition and the time of completion of additional addition, respectively.

Example 5

The following were changed from Example 1. In the dispersing step, on the occasion of purging the air in the autoclave with nitrogen before temperature rise, an operation of pressurizing the inside of the autoclave with nitrogen to 0.5 MPa(G) and releasing the gas in the autoclave until the pressure in the autoclave reached atmospheric pressure was repeated three times. At each of the time of commencing the additional addition of styrene monomer, the time of lapsing 2.5 hours from commencement of the addition, and the time of completion of additional addition, the styrene content in the styrene-based resin particle was measured by a method as mentioned later. As a result, the styrene content in the seed particle was 6% by weight in all of the cases.

Example 6

The following were changed from Example 1. Specifically, the supply amount of the seed particle (seed particle 1) was changed to 67 kg. In addition, in the additional impregnation polymerization step, the holding time at the temperature in the autoclave of 105° C. was changed to 6 hours and 30 minutes, the amount of styrene to be additionally added was changed to 299 kg, and the styrene was continuously added in the autoclave at a rate of 0.8 kg/min over 6 hours and 10 minutes. At each of the time of commencing the additional addition of styrene monomer, the time of lapsing 2.5 hours from commencement of the addition, and the time of completion of additional addition, the styrene content in the styrene-based resin particle was measured by a method as mentioned later. As a result, the styrene content in the seed particle was 10% by weight at the time of commencing the additional addition of styrene monomer and 6% by weight at each of the time of lapsing 2.5 hours from commencement of the addition and the time of completion of additional addition, respectively.

Example 7

[Dispersing Step]

In an autoclave having an internal volume of 1.5 $m^3$ and equipped with a stirring device, 410 kg of deionized water, 2.56 kg of sodium pyrophosphate, and 6.39 kg of magnesium nitrate were supplied, and magnesium pyrophosphate as a suspending agent was synthesized in the autoclave by means of salt exchange. 0.128 kg of a sodium alkylsulfonate (40% aqueous solution of "LATEMUL PS", manufactured by Kao Corporation) as a surfactant and 78.2 kg of the styrene-based resin particle (seed particle 1) obtained in Production Example 1 as a seed particle were supplied in the autoclave, and then, the gas phase part of the autoclave was purged with nitrogen. Specifically, the inside of the autoclave was pressurized with nitrogen to 0.3 MPa(G), and thereafter, the gas in the autoclave was released until the pressure in the autoclave reached atmospheric pressure.

[Impregnation Step]

Subsequently, the temperature was raised to 80° C. while stirring the aqueous medium in the autoclave at 50 rpm. After the temperature in the autoclave reached 80° C., the rotation number of stirring of the aqueous medium in the autoclave was changed to 100 rpm, and an emulsion as mentioned later was supplied in the autoclave. Thereafter, the inside of the autoclave was pressurized with nitrogen to 0.1 MPa(G), followed by holding at 80° C. for 15 minutes.

The emulsion was one obtained by preparing a mixture of 82 kg of deionized water, 0.166 kg of a sodium alkylsulfonate (40% aqueous solution of "LATEMUL PS", manufactured by Kao Corporation), 27.6 kg of styrene (styrene monomer), 1.54 kg of t-butylperoxy-2-ethylhexyl monocarbonate ("PERBUTYL E"; BE, 10-hour half-life temperature $T_{1/2}$: 99.0° C., manufactured by NOF Corporation) as a polymerization initiator, and 0.22 kg of an α-methylstyrene dimer ("NOFMER MSD", manufactured by NOF Corporation; described as "α-MSD" in the tables) by using a homogenizer.

[Polymerization Commencing Step]

Thereafter, the temperature in the autoclave was raised to 105° C. over 1 hours while stirring the aqueous medium in the autoclave at 100 rpm.

[Additional Impregnation Polymerization Step]

After the temperature in the autoclave reached 105° C., the autoclave was held for 7 hours and 30 minutes while stirring the aqueous medium at 100 rpm. Since the temperature in the autoclave reached 105° C., 354.3 kg of styrene (styrene monomer) was continuously added in the autoclave at a rate of 0.87 kg/min over 7 hours and 30 minutes. Upon the addition of styrene, simulation was performed on a basis of the polymerization rate of styrene calculated from the aforementioned addition condition, the chemical characteristics of the polymerization initiator used for the polymerization, and the styrene was additionally added in the autoclave such that the styrene content in the seed particle during the addition of styrene was 10% by weight or less. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 5% by weight at the time of commencing the additional addition of styrene monomer, 7% by weight at the time of lapsing 3 hours from commencement of the addition, and 6% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 6.3% by weight.

[Residual Polymerization Step]

After the additional impregnation polymerization step, the aqueous medium in the autoclave was subjected to temperature rise to 120° C. over 2 hours while stirring the aqueous medium at 100 rpm and then held at 120° C. for 3 hours, thereby polymerizing the unreacted styrene monomer.

[Cooling Step]

After the residual monomer polymerization step, the aqueous medium in the autoclave was cooled to 35° C. over 6 hours while stirring the aqueous medium at 100 rpm. After cooling the inside of the autoclave, the styrene-based resin particle taken out from the autoclave was washed with dilute nitric acid to dissolve and remove the suspending agent attached onto the surface of the resin particle. Thereafter, the particle was washed with water and then dehydrated with a centrifuge. The resulting particle was coated with 0.01 part by weight (value based on 100 parts by weight of the styrene-based resin) of polyoxyethylene lauryl ether as an antistatic agent, and then, the moisture attached onto the surface of the resin particle was removed with a fluidized dryer.

Example 8

A styrene-based resin was prepared in the same manner as in Example 7, except for changing the amount of the polymerization initiator from 1.54 kg to 2.43 kg and changing the amount of the chain transfer agent from 0.22 kg to 0.88 kg. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 3% by weight at the time of commencing the additional addition of styrene monomer, 6% by weight at the time of lapsing 3 hours from commencement of the addition, and 5% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 4.5% by weight.

Example 9

A styrene-based resin was prepared in the same manner as in Example 7, except for changing the amount of the polymerization initiator from 1.54 kg to 3.06 kg and changing the amount of the chain transfer agent from 0.22 kg to 1.15 kg. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 2% by weight at the time of commencing the additional addition of styrene monomer, 5% by weight at the time of lapsing 3 hours from commencement of the addition, and 4% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 3.9% by weight.

Example 10

A styrene-based resin was prepared in the same manner as in Example 7, except for using 1.62 kg of t-hexyl peroxybenzoate ("PERHEXYL Z"; described as "HZ" in the tables, 10-hour half-life temperature $T_{1/2}$: 99.4° C., manufactured by NOF Corporation) as a polymerization initiator and changing the amount of the chain transfer agent from 0.22 kg to 0.88 kg. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 5% by weight at the time of commencing the additional addition of styrene monomer, 7% by weight at the time of lapsing 3 hours from commencement of the addition, and 6% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 6.2% by weight.

Example 11

A styrene-based resin was prepared in the same manner as in Example 7, except for using 1.62 kg of t-hexyl peroxybenzoate ("PERBUTYL Z"; described as "TBPB" in the tables, 10-hour half-life temperature $T_{1/2}$: 104.3° C., manufactured by NOF Corporation) as a polymerization initiator, changing the amount of the chain transfer agent from 0.22 kg to 0.88 kg, and changing the temperature in the autoclave in the additional impregnation polymerization step from 105° C. to 110° C. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 5% by weight at the time of commencing the additional addition of styrene monomer, 6% by weight at the time of lapsing 3 hours from commencement of the addition, and 5% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 5.1% by weight.

Example 12

A styrene-based resin was prepared in the same manner as in Example 7, except that in the impregnation step, 11 g of divinylbenzene (described as "DVB" in the tables) as a branching agent (polyfunctional monomer) was mixed in the styrene monomer and the polymerization initiator. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 5% by weight at the time of commencing the additional addition of styrene monomer, 7% by weight at the time of lapsing 3 hours from commencement of the addition, and 6% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 6.3% by weight. Example 12 is concerned with a working example regarding only the production method of the second embodiment of the present invention.

Example 13

A styrene-based resin was prepared in the same manner as in Example 7, except for changing the amount of the seed particle (seed particle 1) from 78.2 kg to 55.2 kg, the amount of the styrene monomer in the impregnation step from 27.6 kg to 22.1 kg, and changing the amount of the styrene monomer in the additional impregnation polymerization step from 354.3 kg to 382.8 kg. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 4% by weight at the time of commencing the additional addition of styrene monomer, 8% by weight at the time of lapsing 3 hours from commencement of the addition, and 6% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 6.0% by weight.

Example 14

A styrene-based resin was prepared in the same manner as in Example 7, except for changing the amount of the seed particle (seed particle 1) from 78.2 kg to 105.8 kg, the amount of the styrene monomer in the impregnation step from 27.6 kg to 41.4 kg, and changing the amount of the styrene monomer in the additional impregnation polymerization step from 354.3 kg to 312.9 kg. At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 8% by weight at the time of commencing the additional addition of styrene monomer and 6% by weight at each of the time of lapsing 3 hours from commencement of the addition and the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 6.7% by weight.

Example 15

A styrene-based resin was prepared in the same manner as in Example 9, except for changing the kind of the chain transfer agent from the α-methylstyrene dimer to n-octyl mercaptan ("THIOCATECHOL 08", manufactured by Kao Corporation; described as "n-OM" in the tables). At each of the time of commencing the additional addition of styrene monomer, the time of lapsing 3 hours from commencement of the addition, and the time of completion of additional addition, the styrene content in the styrene-based resin particle was measured by a method as mentioned later. As a result, the styrene content in the seed particle was 5% by weight at the time of commencing the additional addition of styrene monomer, 7% by weight at the time of lapsing 3 hours from commencement of the addition, and 6% by weight at the time of completion of additional addition, respectively. In addition, an arithmetic average of the styrene contents in the seed particle at the time of commencing the additional addition of styrene monomer, the time of lapsing 3 hours from commencement of the addition, and the time of completion of additional addition was determined. As a result, it was found to be 6.3% by weight.

Example 16

The following were changed from Example 1. Specifically, in the dispersing step, the supply amount of the seed particle (seed particle 1) was changed to 55.6 kg. In the impregnation step, the amount of styrene was changed to 26.8 kg, and the polymerization initiator was changed to 6.3 kg of t-hexyl peroxybenzoate ("PERHEXYL Z"; HZ, 10-hour half-life temperature $T_{1/2}$: 99.4° C., manufactured by NOF Corporation). In the additional impregnation polymerization step, the holding time at 105° C. in the autoclave was changed to 8 hours and 12 minutes, and the amount of styrene to be additionally added was changed to 366 kg.

Example 17

A styrene-based resin was prepared in the same manner as in Example 16, except for changing the amount of the polymerization initiator from 6.3 kg to 4.75 kg.

Comparative Example 1

A styrene-based resin was prepared in the same manner as in Example 1, except that after the impregnation step, the temperature in the autoclave was raised from 80° C. to 90° C. over 2 hours; and that the temperature in the additional impregnation polymerization step was changed to 90° C. At each of the time of commencing the additional addition of styrene monomer, the time of lapsing 2.5 hours from commencement of the addition, and the time of completion of additional addition, the styrene content in the styrene-based resin particle was measured by a method as mentioned later. As a result, the styrene content in the seed particle was 19% by weight at the time of commencing the additional addition of styrene monomer, 25% by weight at the time of lapsing 2.5 hours from commencement of the addition, and 24% by weight at the time of completion of additional addition, respectively.

Comparative Example 2

The following were changed from Example 1. Specifically, in the dispersing step, the supply amount of the seed particle (seed particle 1) was changed to 105 kg. In the impregnation step, the temperature in the autoclave was changed to 75° C. With respect to the emulsion to be supplied in the autoclave after reaching 75° C., the amount of styrene was changed to 53 kg; the polymerization initiator was changed to 1.79 g of benzoyl peroxide ("NYPER BW", water-diluted powder product; described as "BPO" in the tables, 10-hour half-life temperature $T_{1/2}$: 73.6° C., manufactured by NOF Corporation) and 0.18 kg of t-butylperoxy-2-ethylhexyl monocarbonate ("TRIGONOX 117", 10-hour half-life temperature $T_{1/2}$: 99.0° C., manufactured by Kayaku Akzo Corporation); and 11 g of divinylbenzene was added as the branching agent (polyfunctional monomer). After supplying the emulsion in the autoclave at 75° C., the temperature in the autoclave was held at 75° C. for 2 hours. After holding the temperature in the autoclave at 75° C. for 2 hours, a mixture of 321 kg of styrene and 89 g of divinylbenzene was continuously added in the autoclave at a rate of 2.1 kg/min over 2 hours and 30 minutes while holding the temperature as it was. At each of the time of commencing the additional addition of styrene monomer, the time of lapsing 1.5 hours from commencement of the addition, and the time of completion of additional addition, the styrene content in the styrene-based resin particle was measured by a method as mentioned later. As a result, the styrene content in the seed particle was 8% by weight at the time of commencing the additional addition of styrene monomer, 58% by weight at the time of lapsing 1.5 hours from commencement of the addition, and 66% by weight at the time of completion of additional addition, respectively. Subsequently, the temperature in the autoclave was raised to 108° C. over 2 hours, raised to 112° C. over 20 minutes, and then raised to 125° C. over 2 hours. Thereafter, the temperature in the autoclave was held at 125° C. for 1 hour and 30 minutes, followed by cooling to 35° C. over 6 hours.

Comparative Example 3

The evaluation was performed using, as the styrene-based resin, a commercially available product (polystyrene "HP780AN", manufactured by DIC Corporation).

Comparative Example 4

The evaluation was performed using, as the styrene-based resin, a commercially available product (polystyrene "G0002", manufactured by PS Japan Corporation).

<Evaluation>

Physical properties of the styrene-based resins of the Examples and Comparative Examples were evaluated by the following methods. The results are shown in Tables 1 to 4.

[Measurement of Remaining Styrene Monomer (Residual Monomer)]

1 g of the styrene-based resin was precisely weighed and dissolved in 25 mL of N,N-dimethylformamide (DMF). The solution was measured by means of gas chromatography (GC) and calibrated with a calibration curve, thereby quantitatively determining the remaining styrene. The measuring condition of the gas chromatography was as follows.

Equipment used: Gas chromatograph GC-9A, manufactured by Shimadzu Corporation

Column filler:

[Liquid phase name] PEG-20M

[Liquid phase impregnation ratio] 25% by weight

[Carrier particle size] 60/80 mesh

[Carrier treatment method] AW-DMCS (water washing, calcination, acid treatment, silane treatment)

Column material: Glass column having an inside diameter of 3 mm and a length of 3,000 mm Carrier gas: $N_2$ Detector: FID (hydrogen flame ionization detector)

Quantitative determination: Internal standard method

[Measurement of Remaining Styrene Oligomer (Styrene Dimer+Styrene Trimer; Residual Oligomer)]

About 0.1 g of the styrene-based resin was precisely weighed and dissolved in 10 mL of tetrahydrofuran. The solution was added dropwise in about 250 mL of n-heptane at 23° C., to deposit the resin. A filtrate from which the resin has been filtered out was measured with a gas chromatographic mass analyzer. A measuring condition of the gas chromatographic mass analysis was as follows.

Equipment used: Gas chromatographic mass analyzer GC/MS-QP5050A, manufactured by Shimadzu Corporation Column: DB-5MS, manufactured by J&W Scientific, Inc., 0.25 mm×30 m (immobile phase: 5% diphenyl-95% dimethyl-polysiloxane)

Carrier gas: Helium, column flow rate=1.6 mL/min

Sample injection amount: 1 μL

[Measurement of Oxygen Concentration in Aqueous Medium]

The oxygen concentration in the aqueous medium at 30° C. just before the temperature rise was measured with a handy dissolved oxygen analyzer DO-110 (manufactured by Nikko Hansen & Co., Ltd.).

[Measurement of Melt Flow Rate of Styrene-Based Resin]

The melt flow rate (MFR) of the styrene-based resin was measured under a condition at a temperature of 190° C. and a load of 2.16 kg in conformity with JIS K7210-1:2014.

[Measurement of Melt Viscosity]

The melt viscosity of the styrene-based resin at 200° C. and at a shear rate of 100 $sec^{-1}$ was measured with CAPILLOGRAPH 1D, manufactured by Toyo Seiki Seisaku-sho, Ltd. For the measurement, an orifice having an inside diameter of 1 mm and a length of 10 mm was used. Five samples for measurement which were randomly collected from the resulting styrene-based resin were measured for the melt viscosity, and an arithmetic average value of those measured values was defined as the melt viscosity of the styrene-based resin.

[Measurement of Melt Tension (MT)]

The melt tension of the styrene-based resin at 200° C. was measured with CAPILLOGRAPH 1D, manufactured by Toyo Seiki Seisaku-sho, Ltd. For the measurement, an orifice having an inside diameter of 2.095 mm and a length of 8 mm was used. The resin in a molten state, which was extruded in a strand form from the orifice at a fall rate of piston of 10 mm/min, was taken off at a take-off speed of 5 m/min through a load measuring section, thereby measuring the load. In order to homogenize the resulting styrene-based resin, LABO PLASTOMILL, manufactured by Toyo Seiki Seisaku-sho, Ltd. was used, and a material obtained by kneading under a condition at a screw rotation number of 50 rpm and a resin temperature of 200° C. was provided as a sample for measurement. In the case where a single body of the styrene-based resin cannot be measured for the melt tension because its melt tension is excessively high, a styrene-based resin composition prepared by kneading the resulting styrene-based resin with a polystyrene "680", manufactured by PS Japan Corporation in a proportion of each of 75% by weight and 50% by weight was used as the sample for measurement and measured for the melt tension thereof. Then, the measured melt tension was extrapolated, a melt tension at the time when the blending amount of "680" was 0% by weight was determined, and the value determined was defined as the melt tension of the styrene-based resin.

[Tetrahydrofuran-Insoluble Matter (THF-Insoluble Matter)]

1 g of the styrene-based resin was precisely weighed, to which was then added 30 mL of tetrahydrofuran, and the styrene-based resin was immersed at 23° C. for 24 hours and then shaken for 5 hours, followed by standing. Subsequently, the supernatant was removed by means of decantation, and 10 mL of tetrahydrofuran was again added, followed by standing. The supernatant was removed by means of decantation, and the residue was dried at 23° C. for 24 hours. The weight after drying was determined, and the tetrahydrofuran-insoluble matter was determined according to the following expression.

Tetrahydrofuran-insoluble matter (%)=[(Insoluble matter weight after drying)/(Weight of sample)]×100

[Molecular Weight Expressed in Terms of Polystyrene by GPC Method]

The number average molecular weight (Mn), the weight average molecular weight (Mw), and the Z average molecular weight (Mz) of the styrene-based resin were measured by the gel permeation chromatography (GPC) method using a linear polystyrene as a standard substance. Specifically, using HLC-8320GPC EcoSEC, manufactured by Tosoh Corporation, the measurement was performed under a condition of eluent: tetrahydrofuran (THF), flow rate: 0.6 mL/min, and sample concentration: 0.1 wt %. As the column, one column of TSKguardcolumn SuperH-H and two columns of TSK-GEL SuperHM-X were serially connected to each other and used. That is, the styrene-based resin was dissolved in tetrahydrofuran (THF) and measured for the molecular weight by the GPC method. The measured value was calibrated with the standard polystyrene (linear), thereby determining the number average molecular weight Mn, the weight average molecular weight Mw, and the Z average molecular weight Mz of the styrene-based resin, respectively.

[Absolute Molecular Weight by GPC-MALS Method]

The number average molecular weight Mn', the weight average molecular weight Mw', and the Z average molecular weight Mz' of the styrene-based resin were measured by the GPC-MALS method.

Specifically, using a Prominence LC-20AD(2HGE)/WS system, manufactured by Shimadzu Corporation and a multi angle light scattering detector "DAWN HELEOS II", manufactured by Wyatt Technology Corporation, the measurement was performed under a condition of eluent: tetrahydrofuran (THF) and flow rate: 1.0 mL/min. As the column, one column of TSKgel HHR-H and two columns of TSKgel GMHHR, all of which are manufactured by Tosoh Corporation, were serially connected to each other and used. The analysis of the measurement was performed with an analysis software ASTRA, manufactured by Wyatt Technology Corporation, thereby determining the number average molecular weight Mn', the weight average molecular weight Mw', and the Z average molecular weight Mz' of the styrene-based resin. An increase in concentration of refractive index, do/dc was analyzed using a value of 0.185 mL/g.

[Contraction Factor and Degree of Long-Chain Branching]

The contraction factor $g_w$, the degree of long-chain branching $B_{m,w}$ per molecule, and the degree of long-chain branching $B_{m,1000}$ per 1,000 styrene units were determined according to the expressions (4) to (8) as mentioned previously. In the present analysis, on the assumption that the styrene-based resin is a three-chain branched structure, the degree of long-chain branching was determined. As for the linear polystyrene, data of the styrene-based resin obtained in Production Example 1 were used.

[Measuring Method of Styrene Content in Seed Particle During Addition of Styrene Monomer in Additional Impregnation Polymerization Step]

In the system at each of the time of commencing the additional addition of the styrene monomer, the time of lapsing 1.5 hours, the time of lapsing 2.5 hours, or the time of lapsing 3.0 hours from commencement of the addition, and the time of completion of additional addition, the temperature in the autoclave was decreased to 30° C. within 10 minutes, and the styrene-based resin was taken out during the polymerization.

The styrene-based resin was dissolved in N,N-dimethylformamide (DMF). The solution was measured by means of gas chromatography (GC) and calibrated with a calibration curve, thereby quantitatively determining the remaining styrene.

The measuring condition of the gas chromatography was as follows.

Equipment used: Gas chromatograph GC-9A, manufactured by Shimadzu Corporation

Column filler:

[Liquid phase name] PEG-20M

[Liquid phase impregnation ratio] 25% by weight

[Carrier particle size] 60/80 mesh

[Carrier treatment method] AW-DMCS (water washing, calcination, acid treatment, silane treatment)

Column material: Glass column having an inside diameter of 3 mm and a length of 3,000 mm Carrier gas: $N_2$ Detector: FID (hydrogen flame ionization detector)

Quantitative determination: Internal standard method

TABLE 1

| | | | Example 1 | Example 2 | Example 3 | Example 4 | Example 5 | Example 6 |
|---|---|---|---|---|---|---|---|---|
| Seed particle | Addition amount | parts by | 100 | 100 | 100 | 100 | 100 | 100 |
| | Average particle diameter | mm | 0.8 | 0.4 | 0.8 | 0.8 | 0.8 | 0.8 |
| | Total addition amount | parts by | 298 | 567 | 298 | 100 | 298 | 566 |
| Styrene monomer | Impregnation step | parts by | 71 | 120 | 71 | 44 | 71 | 119 |
| | Additional impregnation polymerization step | parts by weight | 227 | 447 | 227 | 56 | 227 | 446 |
| Oxygen concentration in aqueous medium | | mg/L | 7 | 7 | 7 | 7 | 5 | 7 |
| Polyfunctional monomer | Kind | parts by | No | No | No | No | No | No |
| | Addition amount | — | — | — | — | — | — | — |
| Polymerization initiator | Kind | parts by | BE | BE | BE | BE | BE | BE |
| | Addition amount | — | 0.35 | 0.35 | 0.35 | 0.43 | 0.35 | 0.35 |
| Yield of styrene-based resin composition | | % | 99 | 99 | 99 | 99 | 97 | 90 |
| Measured value and calculated value by GPC method | Mn | $\times 10^4$ | 18 | 18 | 18 | 17 | 15 | 18 |
| | Mw | $\times 10^4$ | 64 | 60 | 55 | 58 | 55 | 65 |
| | Mz | $\times 10^4$ | 130 | 120 | 120 | 120 | 120 | 130 |
| | Mw/Mn | — | 3.6 | 3.3 | 3.1 | 3.4 | 3.7 | 3.6 |

TABLE 1-continued

| | | | Example 1 | Example 2 | Example 3 | Example 4 | Example 5 | Example 6 |
|---|---|---|---|---|---|---|---|---|
| | Mz/Mw | — | 2.1 | 2.1 | 2.2 | 2.1 | 2.1 | 2.0 |
| | Mz/Mn | — | 7.2 | 6.7 | 6.7 | 7.1 | 8.0 | 7.2 |
| Measured value and calculated value by GPC-MALS method | Mn' | $\times 10^4$ | 80 | 110 | 65 | 80 | 80 | 110 |
| | Mw' | $\times 10^4$ | 160 | 200 | 120 | 120 | 160 | 210 |
| | Mz' | $\times 10^4$ | 480 | 510 | 320 | 330 | 480 | 530 |
| | Mw'/Mn' | — | 2.0 | 1.8 | 1.8 | 1.5 | 2.0 | 1.9 |
| | Mz'/Mw' | — | 3.0 | 2.6 | 2.7 | 2.8 | 3.0 | 2.5 |
| | Mz'/Mn' | — | 6.0 | 4.6 | 4.9 | 4.1 | 6.0 | 4.8 |
| Calculated value | Mn/Mn' | — | 0.22 | 0.17 | 0.28 | 0.21 | 0.19 | 0.16 |
| | Mw/Mw' | — | 0.40 | 0.30 | 0.46 | 0.48 | 0.34 | 0.31 |
| | Mz/Mz' | — | 0.28 | 0.24 | 0.38 | 0.36 | 0.24 | 0.25 |
| Contraction factor $g_w$ | | — | 0.70 | 0.65 | 0.70 | 0.70 | 0.65 | 0.70 |
| Degree of long-chain branching $B_{m,w}$ | | per molecule | 5.2 | 9.1 | 5.2 | 5.2 | 9.1 | 5.2 |
| Degree of long-chain branching $B_{m,1000}$ | | per 1,000 units | 0.34 | 0.47 | 0.45 | 0.45 | 0.59 | 0.26 |
| THF-insoluble matter | | % by weight | <0.01 | 0.05 | <0.01 | <0.01 | <0.01 | <0.01 |
| Residual monomer | | ppm by weight | 14 | 130 | 100 | 100 | 162 | 100 |
| Residual oligomer | | % by weight | 0.08 | 0.08 | 0.08 | 0.08 | 0.08 | 0.08 |
| Melt flow rate (MFR) | | g/10 min | 2.1 | 1.5 | 2.5 | 2.5 | 2.1 | 1.4 |
| Melt viscosity | | Pa · s | 1850 | 1950 | 1750 | 1750 | 1850 | 2000 |
| Melt tension | | mN | 550 | 750 | 400 | 400 | 600 | 900 |
| (Melt tension)/(Melt viscosity) | | mN/(Pa · s) | 0.30 | 0.38 | 0.23 | 0.23 | 0.32 | 0.45 |

TABLE 2

| | | | Example 7 | Example 8 | Example 9 | Example 10 | Example 11 | Example 12 |
|---|---|---|---|---|---|---|---|---|
| Seed particle | Addition amount | parts by weight | 100 | 100 | 100 | 100 | 100 | 100 |
| | Average particle diameter | mm | 0.8 | 0.8 | 0.8 | 0.8 | 0.8 | 0.8 |
| Styrene monomer | Total addition amount | parts by weight | 488 | 488 | 488 | 488 | 488 | 488 |
| | Impregnation step | parts by weight | 35 | 35 | 35 | 35 | 35 | 35 |
| | Additional impregnation polymerization step | parts by weight | 453 | 453 | 453 | 453 | 453 | 453 |
| Oxygen concentration in aqueous medium | | mg/L | 7 | 7 | 7 | 7 | 7 | 7 |
| Polyfunctional monomer | Kind | — | No | No | No | No | No | DVB |
| | Addition amount | parts by weight | — | — | — | — | — | 0.005 |
| Polymerization initiator | Kind | | BE | BE | BE | HZ | TBPB | BE |
| | Addition amount | parts by weight | 0.34 | 0.53 | 0.67 | 0.35 | 0.35 | 0.34 |
| Yield of styrene-based resin composition | | % | 99 | 99 | 99 | 99 | 99 | 99 |
| Measured value and calculated value by GPC method | Mn | $\times 10^4$ | 14 | 12 | 12 | 13 | 13 | 14 |
| | Mw | $\times 10^4$ | 60 | 47 | 47 | 56 | 59 | 60 |
| | Mz | $\times 10^4$ | 129 | 103 | 103 | 106 | 129 | 130 |
| | Mw/Mn | — | 4.1 | 4.0 | 4.1 | 4.2 | 4.4 | 4.3 |
| | Mz/Mw | — | 2.2 | 2.2 | 2.2 | 1.9 | 2.2 | 2.2 |
| | Mz/Mn | — | 8.9 | 8.8 | 9.0 | 7.9 | 9.7 | 9.3 |
| Measured value and calculated value by GPC-MALS method | Mn' | $\times 10^4$ | 91 | 62 | 51 | 77 | 40 | 90 |
| | Mw' | $\times 10^4$ | 222 | 164 | 133 | 164 | 126 | 220 |
| | Mz' | $\times 10^4$ | 1087 | 1085 | 587 | 560 | 462 | 1000 |
| | Mw'/Mn' | — | 2.4 | 2.7 | 2.6 | 2.1 | 3.1 | 2.4 |
| | Mz'/Mw' | — | 4.9 | 6.6 | 4.4 | 3.4 | 3.7 | 4.5 |
| | Mz/Mn' | — | 12.0 | 17.6 | 11.6 | 7.2 | 11.4 | 11.1 |
| Calculated value | Mn/Mn' | — | 0.16 | 0.19 | 0.23 | 0.17 | 0.33 | 0.16 |
| | Mw/Mw' | — | 0.27 | 0.28 | 0.35 | 0.34 | 0.47 | 0.27 |
| | Mz/Mz' | — | 0.12 | 0.09 | 0.18 | 0.19 | 0.28 | 0.13 |
| Contraction factor $g_w$ | | — | 0.66 | 0.72 | 0.75 | 0.78 | 0.67 | 0.64 |
| Degree of long-chain branching $B_{m,w}$ | | per molecule | 6.4 | 4.6 | 3.8 | 3.1 | 6.1 | 7.2 |
| Degree of long-chain branching $B_{m,1000}$ | | per 1,000 units | 0.30 | 0.29 | 0.30 | 0.20 | 0.50 | 0.34 |
| THF -insoluble matter | | % by weight | <0.01 | <0.01 | <0.01 | <0.01 | <0.01 | 0.1 |
| Residual monomer | | ppm by weight | 100 | 100 | 100 | 100 | 100 | 100 |
| Residual oligomer | | % by weight | 0.05 | 0.05 | 0.05 | 0.05 | 0.05 | 0.05 |
| Melt flow rate (MFR) | | g/10 min | 1.6 | 3.2 | 4.0 | 2.0 | 1.5 | 1.8 |
| Melt viscosity | | Pa · s | 1981 | 1635 | 1384 | 1934 | 1994 | 1950 |
| Melt tension | | mN | 1150 | 800 | 500 | 1000 | 1370 | 1150 |
| (Melt tension)/(Melt viscosity) | | mN/(Pa · s) | 0.58 | 0.49 | 0.36 | 0.52 | 0.69 | 0.59 |
| Chain transfer agent | Kind | — | α-MSD | α-MSD | α-MSD | α-MSD | α-MSD | α-MSD |
| | Addition amount | parts by weight | 0.05 | 0.20 | 0.25 | 0.20 | 0.05 | 0.05 |
| (Addition amount of chain transfer agent)/(Addition amount of polymerization initiator) | | — | 0.15 | 0.38 | 0.37 | 0.57 | 0.14 | 0.15 |

TABLE 3

| | | | Example 13 | Example 14 | Example 15 | Example 16 | Example 17 |
|---|---|---|---|---|---|---|---|
| Seed particle | Addition amount | parts by weight | 100 | 100 | 100 | 100 | 100 |
| | Average particle diameter | mm | 0.8 | 0.8 | 0.8 | 0.8 | 0.8 |
| | Total addition amount | parts by weight | 733 | 335 | 488 | 733 | 733 |
| Styrene monomer | Impregnation step | parts by weight | 40 | 40 | 35 | 50 | 50 |
| | Additional impregnation polymerization step | parts by weight | 693 | 295 | 453 | 683 | 683 |
| Oxygen concentration in aqueous medium | | mg/L | 7 | 7 | 7 | 7 | 7 |
| Polyfunctional monomer | Kind | — | No | No | No | No | No |
| | Addition amount | parts by weight | — | — | — | — | — |
| Polymerization initiator | Kind | — | BE | BE | BE | HZ | HZ |
| | Addition amount | parts by weight | 0.34 | 0.34 | 0.67 | 0.35 | 0.45 |
| Yield of styrene-based resin composition | | % | 99 | 99 | 99 | 99 | 99 |
| Measured value and calculated value by GPC method | Mn | $\times 10^4$ | 13 | 16 | 8 | 16 | 22 |
| | Mw | $\times 10^4$ | 57 | 58 | 44 | 86 | 92 |
| | Mz | $\times 10^4$ | 123 | 130 | 112 | 180 | 180 |
| | Mw/Mn | — | 4.4 | 3.7 | 5.4 | 5.4 | 4.2 |
| | Mz/Mw | — | 2.1 | 2.3 | 2.6 | 2.1 | 2.0 |
| | Mz/Mn | — | 9.5 | 8.3 | 13.9 | 11.3 | 8.2 |
| Measured value and calculated value by GPC-MALS method | Mn' | $\times 10^4$ | 112 | 78 | 62 | 240 | 266 |
| | Mw' | $\times 10^4$ | 218 | 162 | 165 | 380 | 420 |
| | Mz' | $\times 10^4$ | 623 | 511 | 660 | 790 | 1050 |
| | Mw'/Mn' | — | 1.9 | 2.1 | 2.6 | 1.6 | 1.6 |
| | Mz'/Mw' | — | 2.9 | 3.1 | 4.0 | 2.1 | 2.5 |
| | Mz'/Mn' | — | 5.6 | 6.6 | 10.6 | 3.3 | 4.0 |
| Calculated value | Mn/Mn' | — | 0.12 | 0.20 | 0.13 | 0.07 | 0.08 |
| | Mw/Mw' | — | 0.26 | 0.35 | 0.27 | 0.23 | 0.22 |
| | Mz/Mz' | — | 0.20 | 0.25 | 0.17 | 0.23 | 0.17 |
| Contraction factor $g_w$ | | | 0.67 | 0.72 | 0.72 | 0.48 | 0.53 |
| Degree of long-chain branching $B_{m,w}$ | | per molecule | 6.1 | 4.6 | 4.6 | 17.8 | 13.2 |
| Degree of long-chain branching $B_{m,1000}$ | | per 1,000 units | 0.29 | 0.29 | 0.29 | 0.49 | 0.33 |
| THF-insoluble matter | | % by weight | <0.01 | <0.01 | <0.01 | <0.01 | <0.01 |
| Residual monomer | | ppm by weight | 100 | 100 | 100 | 380 | 100 |
| Residual oligomer | | % by weight | 0.05 | 0.05 | 0.05 | 0.08 | 0.08 |
| Melt flow rate (MFR) | | g/10 min | 1.8 | 2.6 | 4.0 | 2.0 | 1.4 |
| Melt viscosity | | Pa · s | 1953 | 1751 | 1405 | 1880 | 2050 |
| Melt tension | | mN | 759 | 677 | 1323 | 1300 | 1450 |
| (Melt tension)/(Melt viscosity) | | mN/(Pa · s) | 0.39 | 0.39 | 0.94 | 0.69 | 0.71 |
| Chain transfer agent | Kind | | α-MSD | α-MSD | n-OM | — | — |
| | Addition amount | parts by weight | 0.05 | 0.05 | 0.25 | — | — |
| (Addition amount of chain transfer agent)/(Addition amount of polymerization initiator) | | | 0.15 | 0.15 | 0.38 | — | — |

TABLE 4

| | | | Comparative Example 1 | Comparative Example 2 | Comparative Example 3 | Comparative Example 4 |
|---|---|---|---|---|---|---|
| Seed particle | Addition amount | parts by weight | 100 | 100 | — | — |
| | Average particle diameter | mm | 0.8 | 0.8 | — | — |
| | Total addition amount | parts by weight | 298 | 356 | — | — |
| Styrene monomer | Impregnation step | parts by weight | 71 | 50 | — | — |
| | Additional impregnation polymerization step | parts by weight | 227 | 306 | — | — |
| Oxygen concentration in aqueous medium | | mg/L | 7 | 7 | — | — |
| Polyfunctional monomer | Kind | — | No | DVB | — | — |
| | Addition amount | parts by weight | — | 0.095 | — | — |
| Polymerization initiator | Kind | | BE | BPO/BE | — | — |
| | Addition amount | parts by weight | 0.35 | 0.45 | — | — |
| Yield of styrene-based resin composition | | % | 99 | 99 | — | — |

TABLE 4-continued

| | | | Comparative Example 1 | Comparative Example 2 | Comparative Example 3 | Comparative Example 4 |
|---|---|---|---|---|---|---|
| Measured value and calculated value by GPC method | Mn | $\times 10^4$ | 19 | 11 | 10 | 11 |
| | Mw | $\times 10^4$ | 76 | 41 | 31 | 28 |
| | Mz | $\times 10^4$ | 147 | 93 | 62 | 51 |
| | Mw/Mn | — | 3.9 | 3.9 | 3.1 | 2.5 |
| | Mz/Mw | — | 1.9 | 2.2 | 2.0 | 1.8 |
| | Mz/Mn | — | 7.7 | 8.5 | 6.2 | 4.5 |
| Measured value and calculated value by GPC-MALS method | Mn' | $\times 10^4$ | 80 | 53 | 35 | 19 |
| | Mw' | $\times 10^4$ | 150 | 110 | 66 | 33 |
| | Mz' | $\times 10^4$ | 290 | 250 | 150 | 52 |
| | Mw'/Mn' | — | 1.9 | 2.1 | 1.9 | 1.7 |
| | Mz'/Mw' | — | 1.9 | 2.3 | 2.3 | 1.6 |
| | Mz'/Mn' | — | 3.6 | 4.7 | 4.3 | 2.8 |
| Calculated value | Mn/Mn' | — | 0.24 | 0.20 | 0.29 | 0.59 |
| | Mw/Mw' | — | 0.51 | 0.39 | 0.47 | 0.85 |
| | Mz/Mz' | — | 0.50 | 0.37 | 0.41 | 0.98 |
| Contraction factor $g_w$ | | — | 0.84 | 0.80 | 0.86 | 1.00 |
| Degree of long-chain branching $B_{m,w}$ | | per molecule | 2.0 | 2.8 | 1.7 | 0.0 |
| Degree of long-chain branching $B_{m,1000}$ | | per 1,000 units | 0.14 | 0.26 | 0.26 | 0.00 |
| THF-insoluble matter | | % by weight | <0.01 | 0.30 | <0.01 | <0.01 |
| Residual monomer | | ppm by weight | 71 | 100 | 445 | 137 |
| Residual oligomer | | % by weight | 0.08 | 0.08 | 0.53 | 0.20 |
| Melt flow rate (MFR) | | g/10 min | 3.3 | 1.6 | 2.1 | 2.1 |
| Melt viscosity | | Pas | 1660 | 2160 | 1770 | 1718 |
| Melt tension | | mN | 300 | 420 | 280 | 154 |
| (Melt tension)/(Melt viscosity) | | mN/(Pa · s) | 0.18 | 0.19 | 0.16 | 0.09 |

As is noted from Tables 1 to 4, in the commercially available styrene-based resins (Comparative Examples 3 and 4), the weight average molecular weight Mw' is less than 1,000,000, and though the fluidity at the time of melting was high, the melt tension was low.

In the styrene-based resins of Comparative Examples 1 and 2 in which the weight average molecular weight Mw' is more than 1,000,000, though the fluidity was high, the melt tension was low (Comparative Example 1), or though the melt tension was high, the fluidity was low (Comparative Example 2), and thus, both high fluidity and high melt tension could not be made compatible with each other.

In contrast, all of the styrene-based resins of Examples 1 to 17 had a melt viscosity of 2,100 Pa·s or less, were excellent in the fluidity, and had a high melt tension of 350 mN or more.

<Evaluation of Thermal Moldability of Laminated Foamed Sheet>

[Production of Laminated Foamed Sheet]

(Extrusion 1)

A raw material in which a polystyrene-based resin having 35 parts by weight of the styrene-based resin obtained in Example 1 mixed with 65 parts by weight of the polystyrene "G0002", manufactured by PS Japan Corporation as used in Comparative Example 4 was blended with 1.8 parts by weight of talc based on 100 parts by weight of the polystyrene-based resin was supplied in a first extruder of a tandem type extruder in which the first extruder having an inside diameter of 90 mm and a second extruder having an inside diameter of 120 mm were connected to each other. The aforementioned polystyrene-based resins were melted and kneaded at 220° C. to provide a molten resin composition, and a mixed butane blowing agent of 65% by weight of isobutane and 35% by weight of n-butane was charged under pressure thereinto and further kneaded, to provide a foamable molten resin composition. The addition amount of the blowing agent was set to 2.7 parts by weight based on 100 parts by weight of the polystyrene-based resins.

Subsequently, the foamable molten resin composition was cooled by the second extruder to regulate the resin temperature to 165° C. (measured between the second extruder and a die), and the foamable molten resin composition was extruded in a cylindrical form at an ejection amount of 105 kg/hr through an annular slit having an aperture of 68 mm and a gap of 0.67 mm and foamed. Immediately thereafter, cooling air at a temperature of 25° C. was blown on the inner face side and the outer face side of this cylindrical foamed body, and while taking up the inner face of the cylindrical foamed body at a speed of 8.2 m/min along a columnar side face of a columnar cooling apparatus (mandrel) having a diameter of 270 mm, the cylindrical foamed body was cut open in the extrusion direction with a cutter installed in a rear section of the mandrel, thereby obtaining an foamed sheet having an apparent density of 91 kg/m$^3$, a thickness of 2.2 mm, and a width of 850 mm. An airflow rate of the cooling air to be blown on the inner face side of the cylindrical foamed body was set to 0.6 m$^3$/min, and an airflow rate of the cooling air to be blown on the outer face side was set to 1.6 m$^3$/mm.

The apparent density of the foamed sheet was determined by dividing the weight of the foamed sheet by the apparent volume of the foamed sheet. The foamed sheet was submerged in water, and the apparent volume of the foamed sheet was determined from an increase of water level thereof.

The resulting foamed sheet was aged for 3 weeks in an atmosphere at 23° C., and then, a high-impact polystyrene (HIPS) resin layer having a basis weight of 120 g/m$^2$ was laminated and bonded onto one surface of the foamed sheet by means of extrusion lamination processing, to obtain a laminated foamed sheet.

(Extrusion 2)

A laminated foamed sheet was obtained in the same manner as in the extrusion 1, except for changing the following point. Specifically, the polystyrene-based resin to be used was changed to a mixture of 35 parts by weight of the polystyrene "HP780AN", manufactured by DIC Corporation as used in Comparative Example 3 and 65 parts by weight of the polystyrene "G0002", manufactured by PS Japan Corporation as used in Comparative Example 4.

(Extrusion 3)

A laminated foamed sheet was obtained in the same manner as in the extrusion 1, except for changing the following point. Specifically, the polystyrene-based resin to be used was changed to 100 parts by weight of the polystyrene "G0002", manufactured by PS Japan Corporation as used in Comparative Example 4.

[Evaluation of Thermal Moldability]

Using a molding machine of a product number: FKS-0631-10, manufactured by Asano Laboratories Co., Ltd., the laminated foamed sheet was thermally molded by means of matched mold vacuum molding such that the HIPS resin layer face of the laminated foamed sheet was faced outside the molded body, thereby obtaining a bowl-shaped molded body (diameter of opening part: 140 mm, depth: 75 mm). On thermally molding the laminated foamed sheet, the thermal molding of the laminated foamed sheet was performed in such a manner that a heater temperature of a heating furnace was set to 310° C. at the HIPS resin layer laminated layer side and 260° C. at the HIPS resin layer non-laminated layer side, respectively; and a heating time was changed to 11 seconds, 13 seconds, 15 seconds, 17 seconds, and 19 seconds, respectively.

The thermal moldability was evaluated as follows. The evaluation results are shown in Table 5.

A: In the molded body, molding failure, such as surface tearing and uneven elongation, is not observed.

B: In the molded body, molding failure, such as surface tearing and uneven elongation, is slightly observed.

C: In the molded body, molding failure, such as surface tearing and uneven elongation, is frequently observed.

As is clear from Table 5, it is noted that the laminated foamed sheet by means of the extrusion 1 as produced using the styrene-based resin of the Example has three points of the condition (heating time) regarding the evaluation "A" of the thermal moldability so that its thermal moldable range is wide.

A uniaxial elongational viscosity was examined using a mixed resin in which the commercially available high-impact polystyrene (HIPS) was mixed with the styrene-based resin of the Examples.

First of all, each of the styrene-based resins of Examples 7 to 11, Comparative Example 2, Comparative Example 3 (commercially available branched polystyrene), and Comparative Example 4 (commercially available linear polystyrene) was mixed with HIPS, manufactured by PS Japan Corporation (Grade Name: 475D, melt viscosity 1,310 Pa·s, a ratio (a1/a2) as mentioned later: 1.04) in a weight ratio of 1/9, and the mixture was kneaded with a twin-screw extruder (screw rotation number: 50 rpm, resin temperature: 200° C.) to obtain a mixed resin pellet.

Subsequently, the mixed resin pellet was pressed with a heat press machine under a condition at 200° C. and processed in a plate form having a thickness of 0.8 mm, thereby preparing a sample for measurement of uniaxial elongational viscosity. Using, as a measuring device, a dynamic viscoelasticity measuring device PHYSICA MCR301 and a tool for measurement of uniaxial elongational viscosity SER, manufactured by Anton Paar GmbH, the uniaxial elongational viscosity was measured for 300 measuring points (acquired in terms of a logarithm from 0.01 s to 26 s) under a condition at 160° C. and 0.5 $s^{-1}$, thereby determining a ratio (a1/a2) of a gradient (a1) of primary approximation straight line in a non-linear region to a gradient (a2) of primary approximation straight line in a linear region in a time-uniaxial elongational viscosity curve (log-log plot). The results are shown in Table 6.

TABLE 6

| Styrene-based resin | | Example 7 | Example 8 | Example 9 | Example 10 | Example 11 | Comparative Example 2 | Comparative Example 3 | Comparative Example 4 |
|---|---|---|---|---|---|---|---|---|---|
| al/a2 | — | 1.81 | 1.80 | 1.80 | 1.80 | 1.90 | 1.16 | 1.12 | 1.12 |
| Melt viscosity | Pa · s | 1500 | 1400 | 1330 | 1470 | 1500 | 1550 | 1450 | 1430 |

TABLE 5

| | | | Extrusion 1 | Extrusion 2 | Extrusion 3 |
|---|---|---|---|---|---|
| Styrene-based resin blend | Example 1 | Parts by weight | 35 | — | — |
| | Comparative Example 3 | Parts by weight | — | 35 | — |
| | Comparative Example 4 | Parts by weight | 65 | 65 | 100 |
| Extrusion foamed sheet | Thickness | mm | 2.2 | 2.2 | 2.2 |
| | Apparent density | kg/m³ | 91 | 91 | 91 |
| Moldability/ appearance | Heating time | 11 sec | B | C | C |
| | | 13 sec | A | C | C |
| | | 15 sec | A | B | C |
| | | 17 sec | A | A | B |
| | | 19 sec | C | C | C |

It is meant that as the ratio (a1/a2) is large, the strain hardening of the resin is large, so that the resin is excellent in the moldability in molding processing, such as blow molding and vacuum molding. In addition, the melt viscosity of the mixed resin pellet was measured by the aforementioned method. As is noted from Table 6, by adding each of the styrene-based resins of Examples 7 to 11 to the high-impact polystyrene, the ratio (a1/a2) becomes large without impairing the fluidity which the high-impact polystyrene has, as compared with that in the Comparative Examples.

The styrene-based resin of the present invention is not only high in the fluidity but also high in the melt tension. Therefore, when it is used for extrusion molding, expansion molding, blow molding, or the like, or it is mixed as a processing aid in a commercially available styrene-based resin to provide a styrene-based resin composition, the resin can be made to be hardly broken at the time of stretching processing.

In addition, in accordance with the production method of the styrene-based resin of the present invention, a styrene-based resin having a branched structure that is high in fluidity and high in melt tension can be provided. Therefore, when the styrene-based resin is used for extrusion molding, expansion molding, blow molding, or the like, or used as a processing aid at the time of such molding, the resin can be made to be hardly broken at the time of stretching processing.

The invention claimed is:

1. A styrene-based resin having a weight average molecular weight Mw' as determined by the GPC-MALS method of 1,000,000 or more and 5,000,000 or less, a degree of long-chain branching of 0.2 or more per 1,000 styrene units, and a tetrahydrofuran-insoluble matter of 0.1% by weight or less (including 0), the styrene-based resin being free from a component derived from a polyfunctional monomer in a molecular chain thereof and having a ratio Mz'/Mn' of a Z average molecular weight Mz' to a number average molecular weight Mn' as determined by the GPC-MALS method of 7 or more.

2. The styrene-based resin according to claim 1, wherein the degree of long-chain branching is 0.3 or more per 1,000 styrene units.

3. The styrene-based resin according to claim 1, wherein the Z average molecular weight Mz' as determined by the GPC-MALS method is 3,000,000 or more.

4. The styrene-based resin according to claim 1, wherein the total content of a styrene dimer and a styrene trimer is 0.1% by weight or less.

5. The styrene-based resin according to claim 1, wherein a melt viscosity at 200° C. and a shear rate of 100 $sec^{-1}$ is 2,100 Pas or less, a melt tension at 200° C. is 350 mN or more, and a ratio of the melt tension to the melt viscosity {(melt tension)/(melt viscosity) [mN/(Pa·s)]} is 0.20 or more.

6. A method for producing a styrene-based resin comprising a dispersing step of dispersing a seed particle comprising a styrene-based resin in an aqueous medium;

an impregnation step of adding a polymerization initiator comprising an organic peroxide and a styrene monomer in the aqueous medium, thereby impregnating the polymerization initiator and the styrene monomer in the seed particle at a temperature at which polymerization of the styrene monomer does not substantially proceed;

a polymerization commencing step of subjecting the aqueous medium to temperature rise, thereby commencing polymerization of the styrene monomer; and an additional impregnation polymerization step of additionally adding the styrene monomer in the aqueous medium, thereby graft polymerizing the styrene monomer on the styrene-based resin while impregnating the styrene monomer in the seed particle, wherein the addition amount of the styrene monomer in the impregnation step is from 10 to 200 parts by weight based on 100 parts by weight of the seed particle, the addition amount of the styrene monomer in the additional impregnation polymerization step is from 50 to 700 parts by weight based on 100 parts by weight of the seed particle, and the content of the styrene monomer in the seed particle in the additional impregnation polymerization step is held at 10% by weight or less, wherein the styrene-based resin has a weight average molecular weight Mw' as determined by the GPC-MALS method of 1,000,000 or more and 5,000,000 or less, a degree of long-chain branching of 0.2 or more per 1,000 styrene units, and a tetrahydrofuran-insoluble matter of 0.1% by weight or less (including 0), the styrene-based resin being free from a component derived from a polyfunctional monomer in a molecular chain thereof and having a ratio Mz'/Mn' of a Z average molecular weight Mz' to a number average molecular weight Mn' as determined by the GPC-MALS method of 7 or more.

7. The method for producing a styrene-based resin according to claim 6, wherein the addition amount of the styrene monomer in the impregnation step is from 20 to 200 parts by weight based on 100 parts by weight of the seed particle.

8. The method for producing a styrene-based resin according to claim 6, wherein the aqueous medium has an oxygen concentration at 30° C. of 4 mg/L or more.

9. The method for producing a styrene-based resin according to claim 6, wherein an average particle diameter of the seed particle in the dispersing step is from 0.3 to 1.2 mm.

10. The method for producing a styrene-based resin according to claim 6, wherein a 10-hour half-life temperature $T_{1/2}$ of the organic peroxide is from 85 to 120° C., a temperature of the aqueous medium in the impregnation step is 70° C. or higher and $(T_{1/2}-15)$° C. or lower, and a temperature of the aqueous medium in the additional impregnation polymerization step is $(T_{1/2}-10)$° C. or higher and $(T_{1/2}+20)$° C. or lower.

11. The method for producing a styrene-based resin according to claim 6, wherein in the additional impregnation polymerization step, the styrene monomer is polymerized in the presence of a chain transfer agent, and a ratio of the total addition amount of the chain transfer agent to the total addition amount of the polymerization initiator is from 0.1 to 0.6.

12. The method for producing a styrene-based resin according to claim 11, wherein in the impregnation step, the chain transfer agent is impregnated in the seed particle.

13. The method for producing a styrene-based resin according to claim 11, wherein the chain transfer agent is an α-methylstyrene dimer.

* * * * *